(12) United States Patent
Nishimura

(10) Patent No.: US 7,075,730 B2
(45) Date of Patent: Jul. 11, 2006

(54) ZOOM LENS SYSTEM AND IMAGE PICKUP APPARATUS INCLUDING THE SAME

(75) Inventor: Takeshi Nishimura, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/166,642

(22) Filed: Jun. 24, 2005

(65) Prior Publication Data
US 2005/0286139 A1    Dec. 29, 2005

(30) Foreign Application Priority Data
Jun. 25, 2004  (JP) .............................. 2004-187856

(51) Int. Cl.
*G02B 15/14* (2006.01)

(52) U.S. Cl. .................. 359/686; 359/680; 359/681; 359/682; 359/683; 359/715; 359/740; 359/781

(58) Field of Classification Search ................ 359/683, 359/686, 680–682, 715, 740, 781
See application file for complete search history.

(56) References Cited

U.S. PATENT DOCUMENTS

| | | | |
|---|---|---|---|
| 4,591,235 A | 5/1986 | Tokumaru et al. | 350/427 |
| 4,653,873 A | 3/1987 | Kawamura | 350/427 |
| 5,132,848 A | 7/1992 | Nishio et al. | 359/686 |
| 5,264,965 A | 11/1993 | Hirakawa | 359/686 |
| 5,329,401 A * | 7/1994 | Sato | 359/686 |
| 5,568,323 A * | 10/1996 | Sensui | 359/689 |
| 5,576,890 A * | 11/1996 | Tanaka et al. | 359/686 |
| 5,585,970 A * | 12/1996 | Shibayama | 359/686 |
| 5,666,230 A * | 9/1997 | Tatsuno | 359/684 |
| 5,710,669 A * | 1/1998 | Endo | 359/686 |
| 5,786,942 A * | 7/1998 | Komori et al. | 359/686 |
| 5,805,351 A * | 9/1998 | Hayashi | 359/686 |
| 5,835,272 A * | 11/1998 | Kodama | 359/684 |
| 5,991,093 A * | 11/1999 | Murata et al. | 359/686 |
| 6,075,653 A * | 6/2000 | Narimatsu et al. | 359/686 |

(Continued)

FOREIGN PATENT DOCUMENTS

GB       2 080 966       2/1982

(Continued)

OTHER PUBLICATIONS

English Abstract for Japanese Application No. 57-011315.

(Continued)

*Primary Examiner*—Evelyn A. Lester
(74) *Attorney, Agent, or Firm*—Morgan & Finnegan, L.L.P.

(57) ABSTRACT

A zoom lens system that has a structure suitable to widen a field angle and realizes high optical performance over the entire zoom range is provided. The zoom lens system includes, in order from an object side to an image side, a first lens unit having negative optical power, a second lens unit having positive optical power, a third lens unit having negative optical power, and a fourth lens unit having positive optical power. During zooming from a wide-angle end to a telephoto end, an axial interval between the first lens unit and the second lens unit reduces, an axial interval between the second lens unit and the third lens unit increases, and an axial interval between the third lens unit and the fourth lens unit reduces. In the zoom lens system, a back focus and refractive indices of the respective lens units are suitably set.

20 Claims, 13 Drawing Sheets

U.S. PATENT DOCUMENTS

| | | | |
|---|---|---|---|
| 6,320,698 B1 * | 11/2001 | Suzuki | 359/686 |
| 6,639,721 B1 * | 10/2003 | Endo | 359/686 |
| 6,710,931 B1 | 3/2004 | Misaka | 359/686 |
| 6,809,880 B1 * | 10/2004 | Murata | 359/686 |
| 2002/0163736 A1 * | 11/2002 | Endo | 359/686 |
| 2004/0027685 A1 * | 2/2004 | Mihara et al. | 359/686 |

FOREIGN PATENT DOCUMENTS

| | | |
|---|---|---|
| JP | 57-011315 | 1/1982 |
| JP | 58-095315 | 6/1983 |
| JP | 59-229517 | 12/1984 |
| JP | 60-055313 | 3/1985 |
| JP | 60-087312 | 5/1985 |
| JP | 61-062013 | 3/1986 |
| JP | 61-123811 | 6/1986 |
| JP | 62-063909 | 3/1987 |
| JP | 02-136812 | 5/1990 |
| JP | 04-163415 | 6/1992 |
| JP | 04-235515 | 8/1992 |
| JP | 05-019170 | 1/1993 |
| JP | 05-313065 | 11/1993 |
| JP | 06-082698 | 3/1994 |
| JP | 07-287168 | 10/1995 |
| JP | 10-082954 | 3/1998 |
| JP | 2000-338397 | 12/2000 |
| JP | 2002-287031 | 10/2002 |

OTHER PUBLICATIONS

English Abstract for Japanese Application No. 58-095315.
English Abstract for Japanese Application No. 59-229517.
English Abstract for Japanese Application No. 60-055313.
English Abstract for Japanese Application No. 60-087312.
English Abstract for Japanese Application No. 61-062013.
English Abstract for Japanese Application No. 61-123811.
English Abstract for Japanese Application No. 62-063909.
English Abstract for Japanese Application No. 02-136812.
English Abstract for Japanese Application No. 05-019170.
English Abstract for Japanese Application No. 02-136812.
English Abstract for Japanese Application No. 04-163415.
English Abstract for Japanese Application No. 04-235515.
English Abstract for Japanese Application No. 05-313065.
English Abstract for Japanese Application No. 06-082698.
English Abstract for Japanese Application No. 07-287168.
English Abstract for Japanese Application No. 10-082954.
English Abstract for Japanese Application No. 2000-338397.
English Abstract for Japanese Application No. 2002-287031.

* cited by examiner

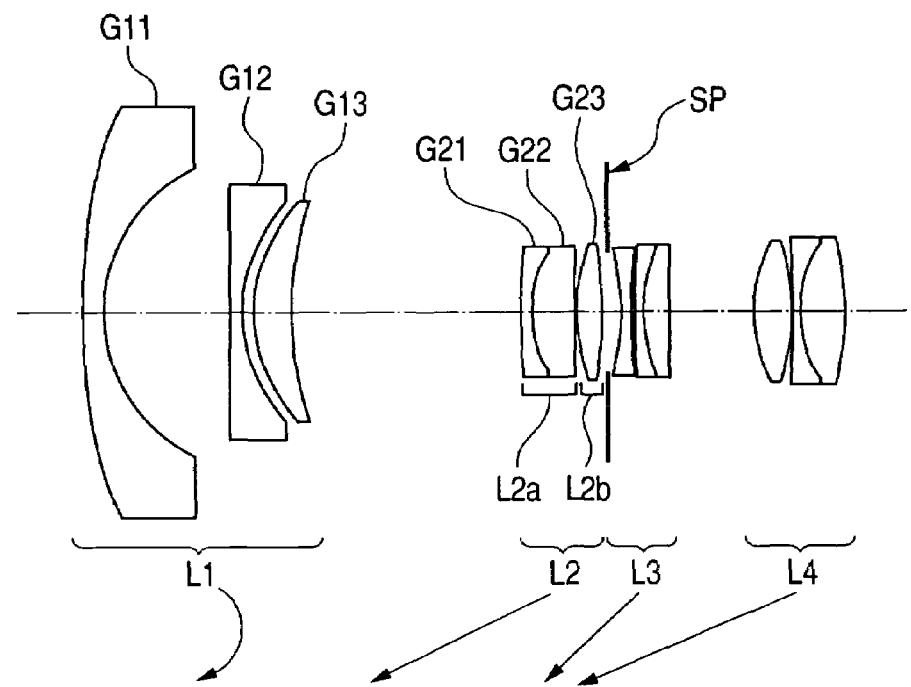
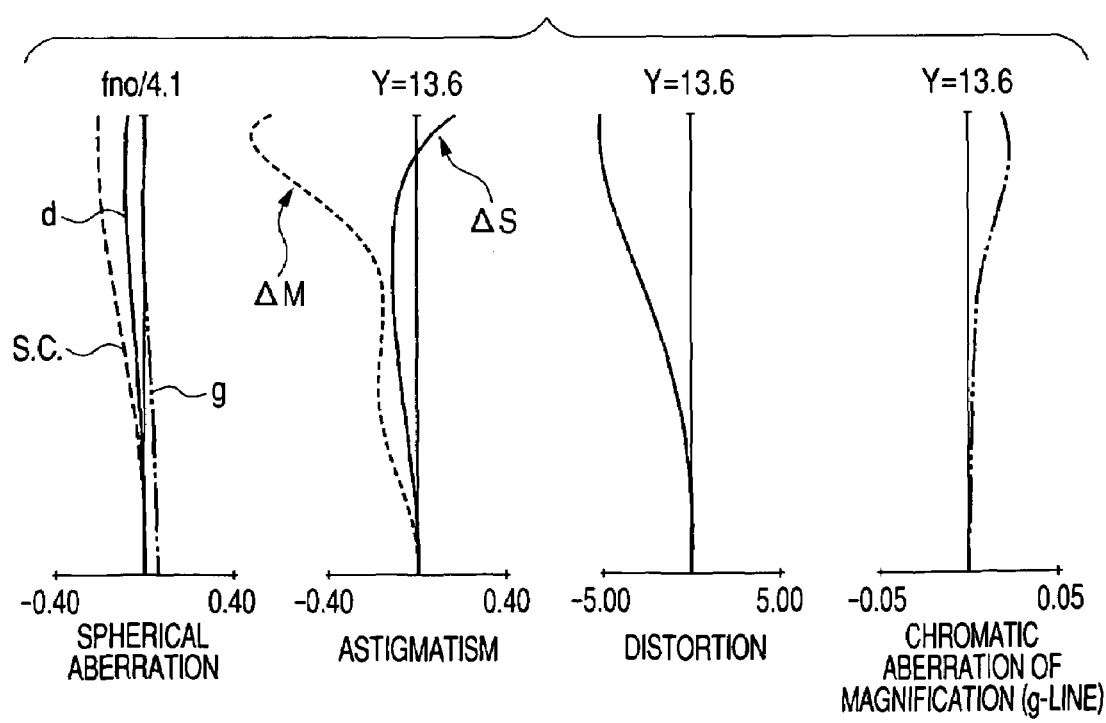

ZOOM LENS SYSTEM AND IMAGE PICKUP APPARATUS INCLUDING THE SAME

BACKGROUND OF THE INVENTION

1. Field of the Invention

The present invention relates to a zoom lens system suitable for use in a photographing optical system for, for example, a silver-halide film camera or a digital still camera.

2. Related Background Art

Up to now, there has been known a so-called negative-lead type zoom lens including the preceding lens unit having a negative refractive power. The negative-lead type zoom lens has advantages in that (a) a closest focusing distance is relatively short,
(b) a field angle is relatively easy to widen, and
(c) a back focus is relatively easy to lengthen.

Therefore, the negative-lead type zoom lens has been adopted to a wide-angle zoom lens in many cases.

Zoom lenses have been proposed in, for example, JP S57-011315 A (corresponding to GB 2080966A), JP S58-095315 A (corresponding to U.S. Pat. No. 4,591,235 B), JP S59-229517 A, JP S60-055313 A, JP S60-087312 A (corresponding to U.S. Pat. No. 4,653,873 B), JP S61-062013 A, JP S61-123811 A, JP S62-063909 A, JP H02-136812 A, JP H04-235515 A (corresponding to U.S. Pat. No. 5,329,401 B), JP H04-163415 A (corresponding to U.S. Pat. No. 5,132,848 B), JP H05-019170 A (corresponding to U.S. Pat. No. 5,264,965 B), JP H05-313065 A, JP H06-082698 A, JP H07-287168 A (corresponding to U.S. Pat. No. 5,585,970 B), JP H10-082954 A, JP 2000-338397 A (corresponding to U.S. Pat. No. 6,710,931 B), JP 2002-287031 A, and JP 2629904 B. Each of the zoom lenses includes a first lens unit having a negative refractive power, a second lens unit having a positive refractive power, a third lens unit having a negative refractive power, and a fourth lens unit having a positive refractive power, which are disposed in order from an object side, and zooming is performed by moving at least two lens units of those lens units.

In recent years, there has been a demand for a zoom lens with wide field angle and a highly improved resolution for a single-lens reflex digital camera.

In general, when the refractive power of each of the lens units in the zoom lens is increased, a distance necessary for each of the lens units to move in order to obtain a predetermined zoom ratio is reduced. Therefore, it is possible to widen the field angle while the entire lens length is shortened.

However, merely increasing the refractive power of each of the lens units leads to large variations of aberrations caused by zooming. In particular, when a wide-field angle is to be realized, it is hard to obtain preferable optical performance over the entire zoom range.

When the filed angle is to be widened, it is hard to ensure the back focus or to correct distortion and astigmatism. Therefore, high performance is not obtained or a size of the zoom lens is likely to increase.

SUMMARY OF THE INVENTION

An object of the present invention is to provide a zoom lens system that has a structure suitable for a wider field angle and can realize high optical performance over the entire zoom range.

According to an exemplary embodiment of the present invention, there is provided a zoom lens system including in order from an object side to an image side: a first lens unit having negative optical power (the reciprocal of a focal length); a second lens unit having positive optical power; a third lens unit having negative optical power; and a fourth lens unit having positive optical power. In the zoom lens system, during zooming of the zooming lens system from a wide-angle end to a telephoto end, an axial interval between the first lens unit and the second lens unit reduces, an axial interval between the second lens unit and the third lens unit increases, and an axial interval between the third lens unit and the fourth lens unit reduces. Further, each of the elements is set to satisfy conditions such as:

$$2.9 < bfw/fw < 5.0,$$

$$3.1 < f4/fw < 4.5,$$

$$0.1 < fw/f2 < 0.42,$$

where bfw represents a back focus of the zooming lens system at the wide-angle end, fw represents a focal length of the entire zooming lens system at the wide-angle end, and f2 and f4 represent a focal length of the second lens unit and a focal length of the fourth lens unit, respectively.

Further, for example, a second lens unit consists, in order from an object side to an image side, of a first lens subunit having negative optical power and a second lens subunit having positive optical power. Each element is set to satisfy conditions:

$$2.9 < bfw/fw < 5.0,$$

$$-0.8 < f2/f2a < -0.05,$$

$$0.1 < fw/f2 < 0.42,$$

where f2 represents a focal length of the second lens unit, and f2a represents a focal length of the first lens subunit.

BRIEF DESCRIPTION OF THE DRAWINGS

FIG. 1 is a lens sectional view showing a zoom lens according to first Embodiment of the present invention;

FIGS. 2A, 2B, and 2C are graphs showing various aberrations of the zoom lens according to first Embodiment of the present invention;

DESCRIPTION OF THE PREFERRED EMBODIMENTS

Figure 2B:
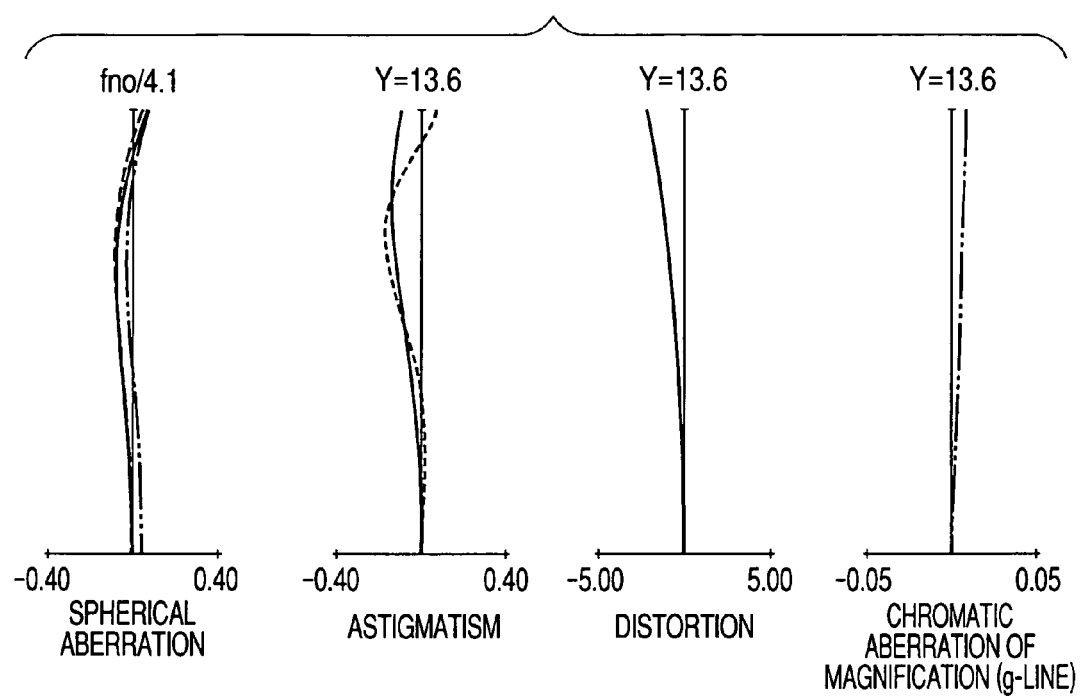
Figure 2C:
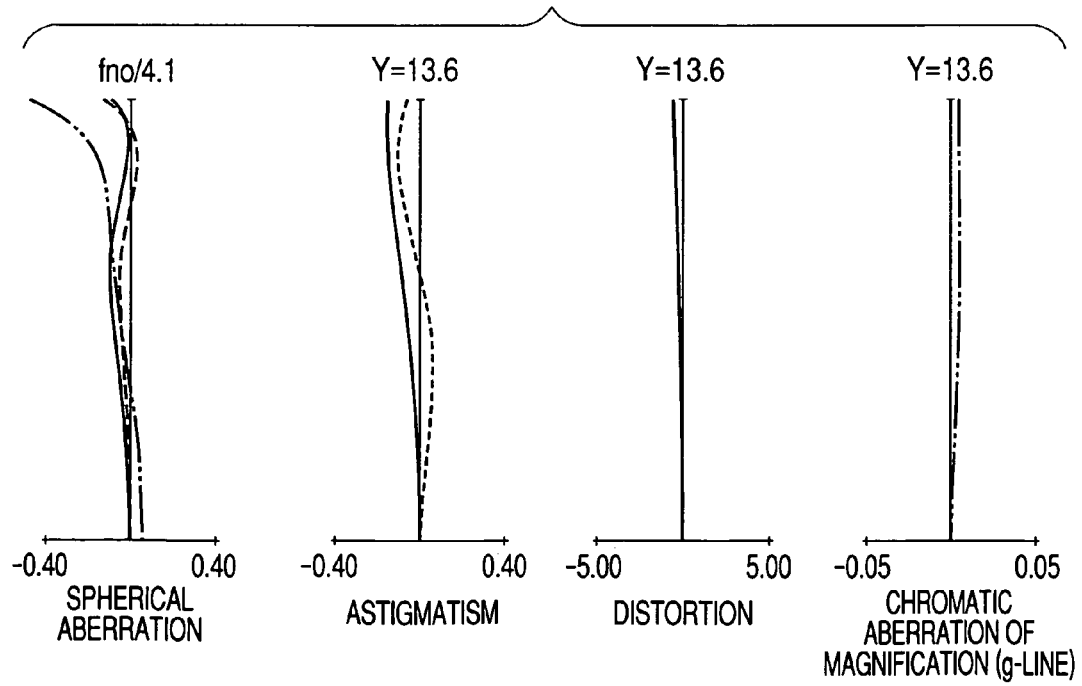
Figure 3:
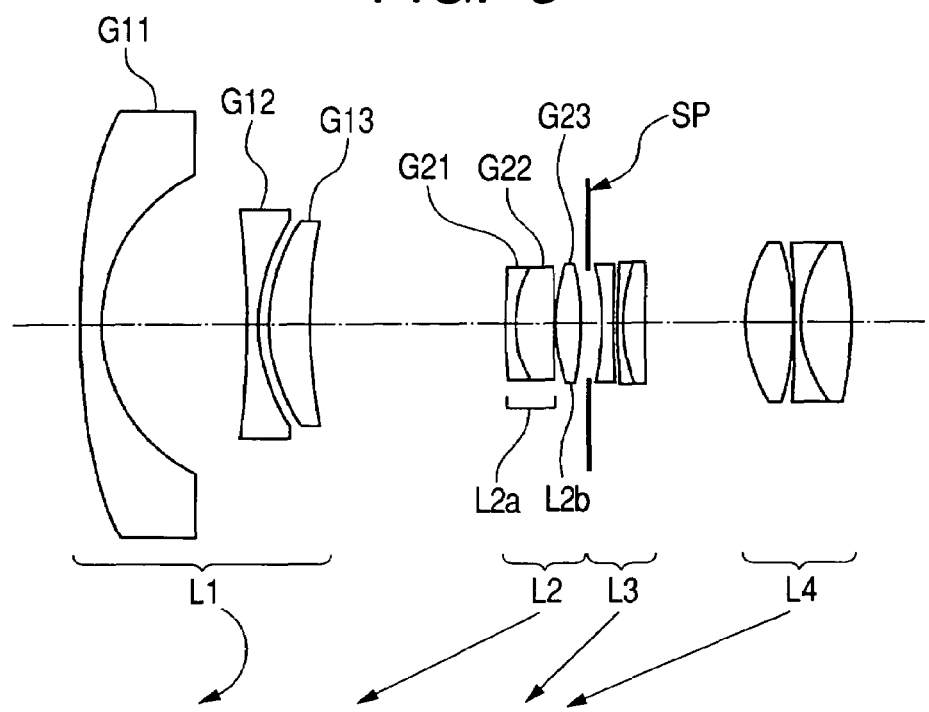
FIG. 3 is a lens sectional view showing a zoom lens according to second Embodiment of the present invention.
Figure 4A:
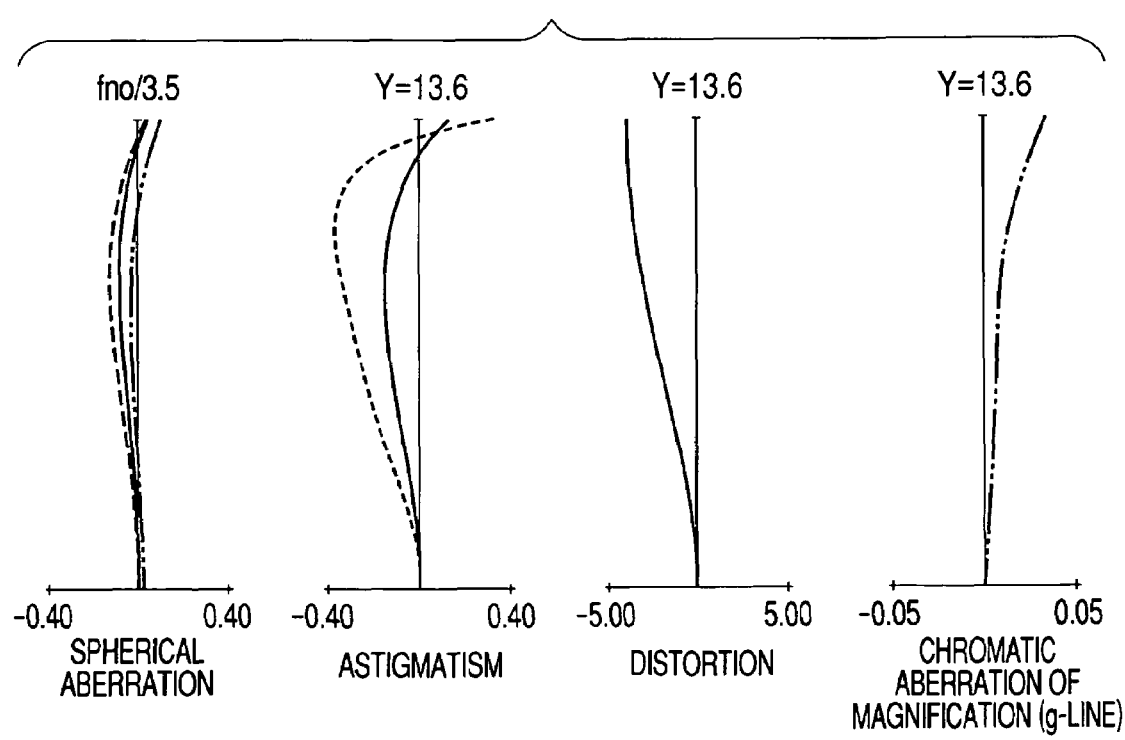
FIGS. 4A, 4B, and 4C are graphs showing various aberrations of the zoom lens according to second Embodiment of the present invention.
Figure 4B:
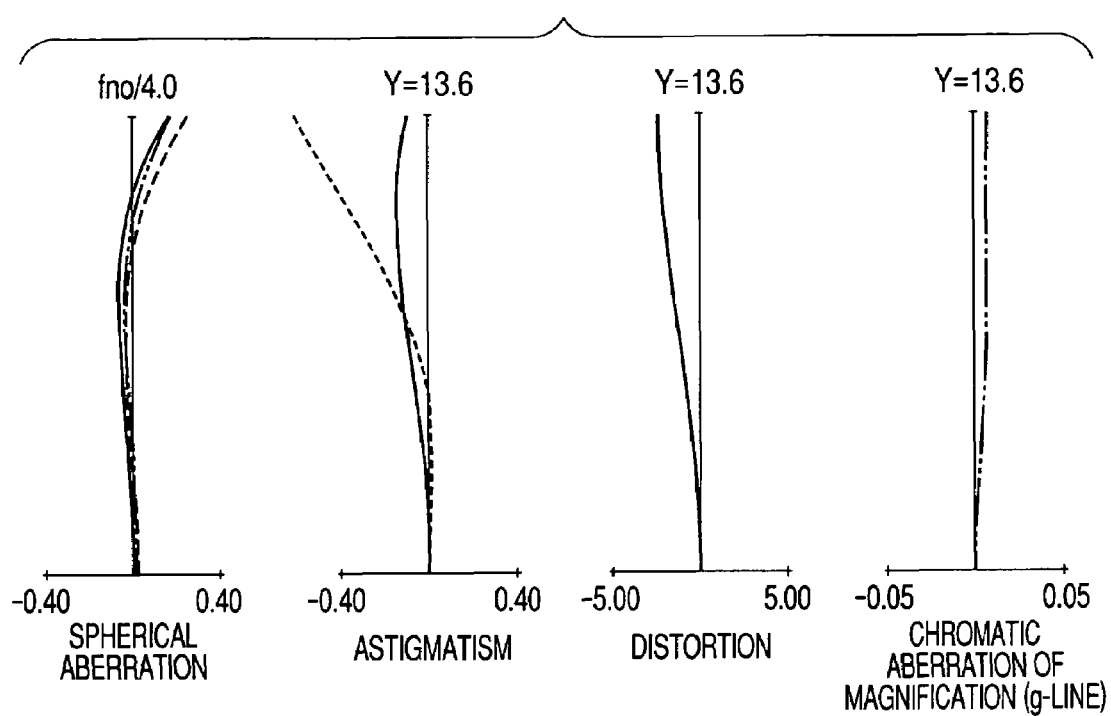
Figure 4C:
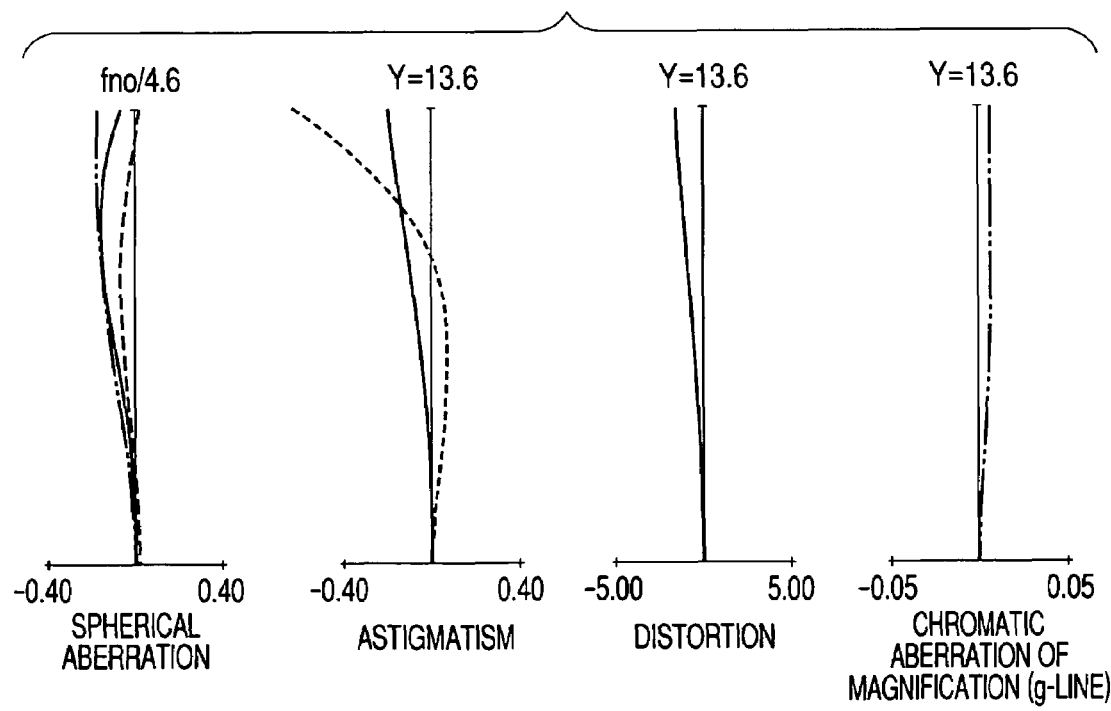
Figure 5:
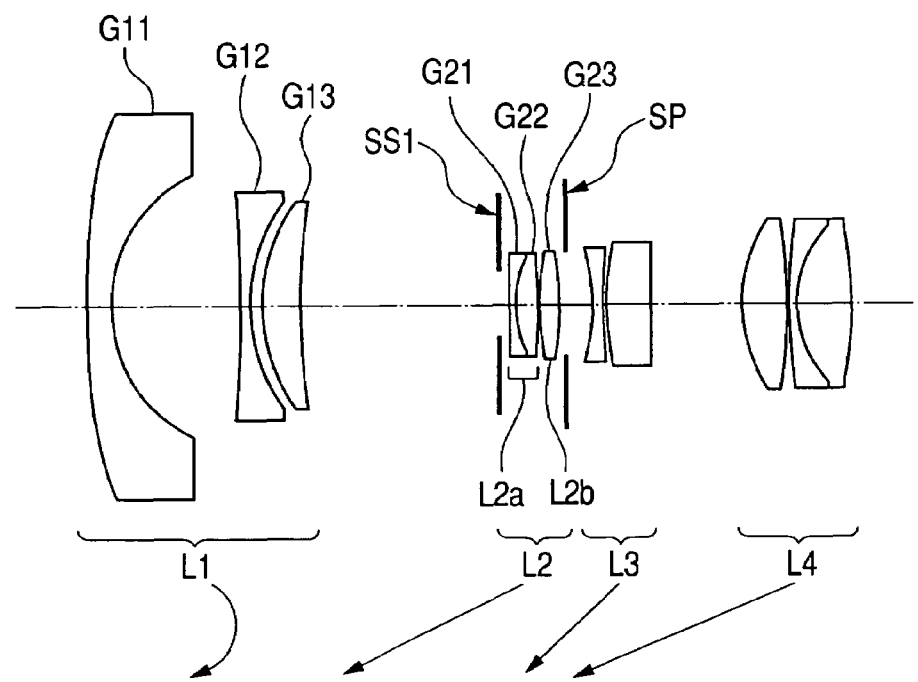
FIG. 5 is a lens sectional view showing a zoom lens according to third Embodiment of the present invention.
Figure 6A:
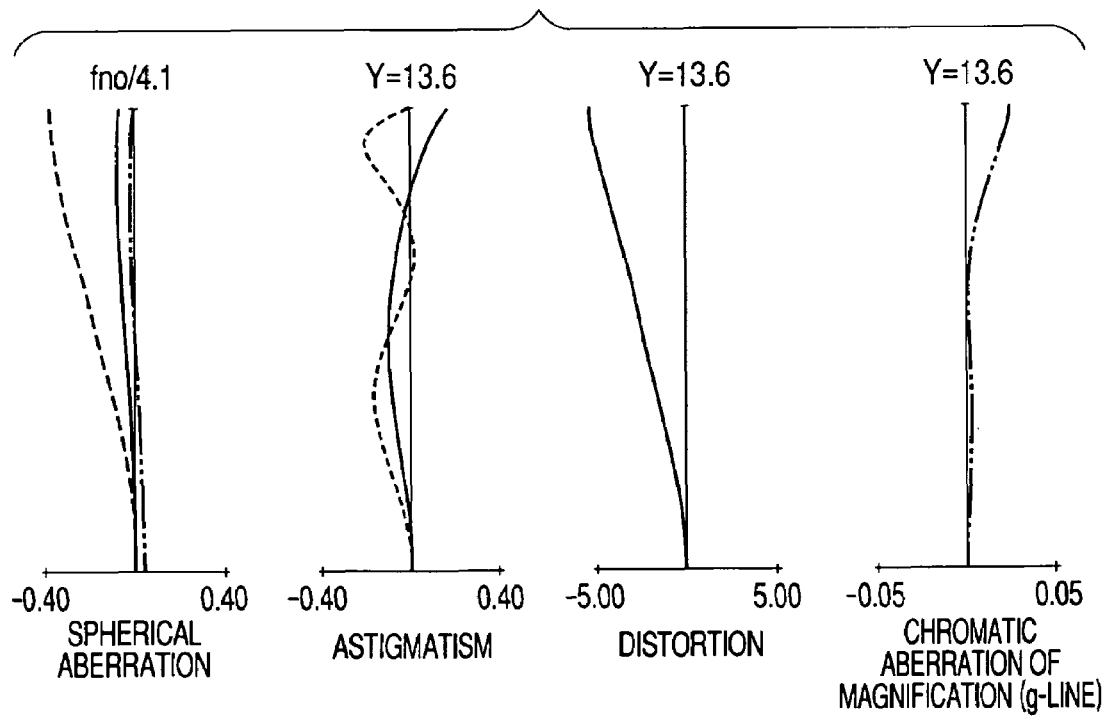
FIGS. 6A, 6B, and 6C are graphs showing various aberrations of the zoom lens according to third Embodiment of the present invention.
Figure 6B:
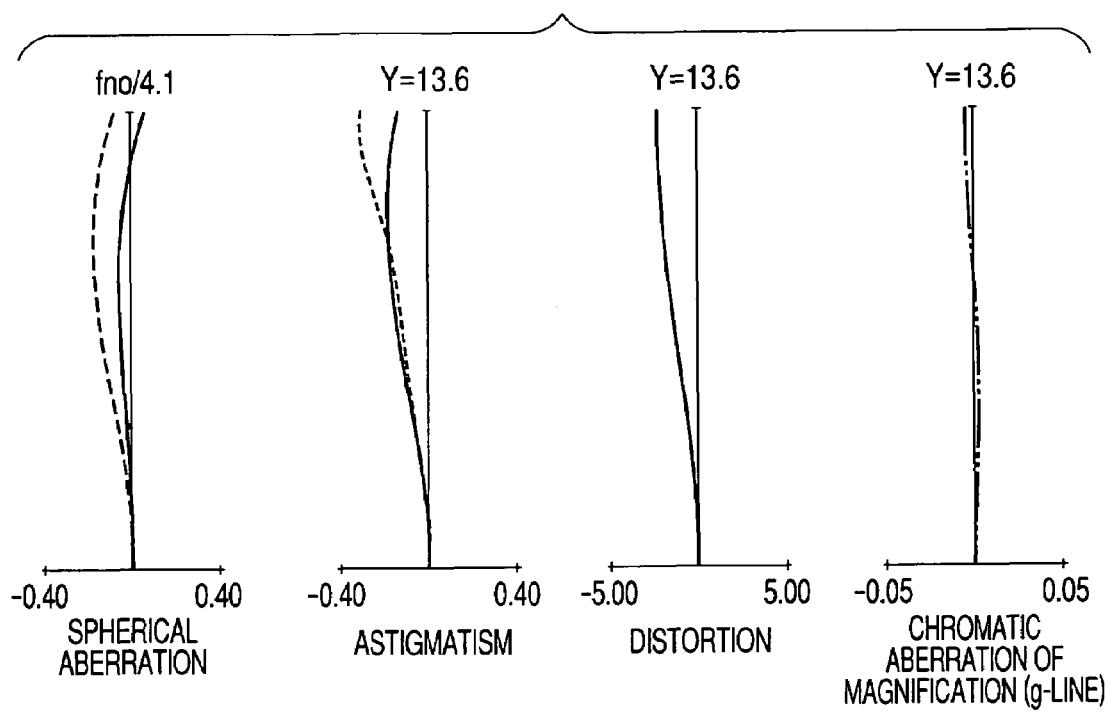
Figure 6C:
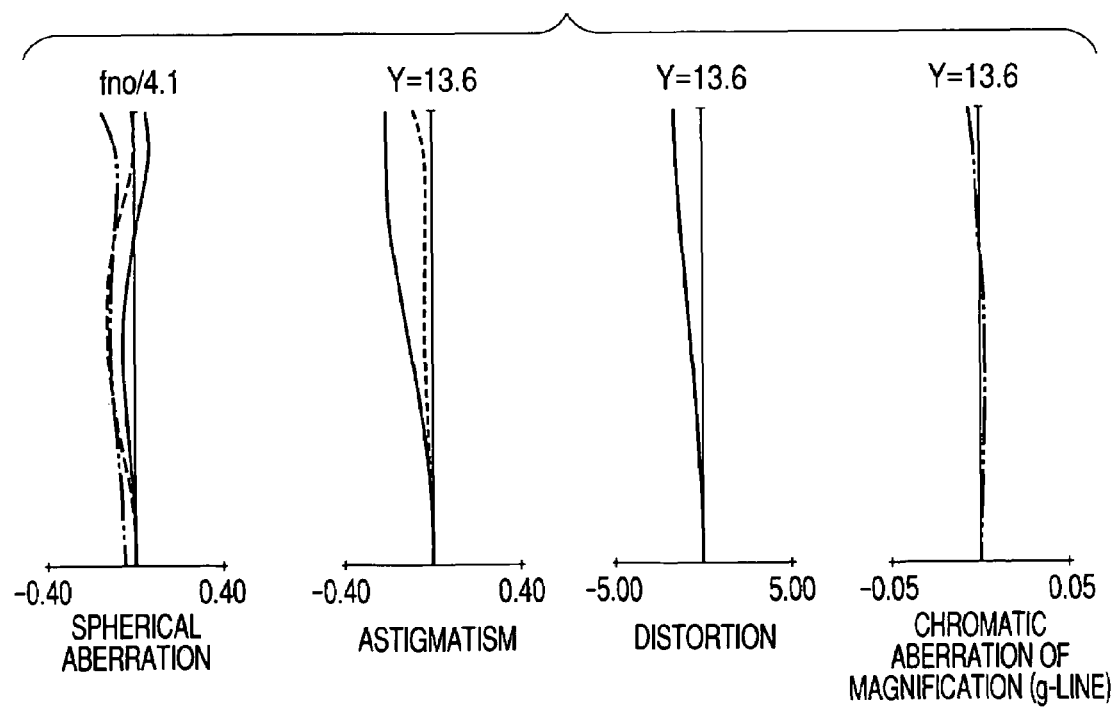
Figure 7:
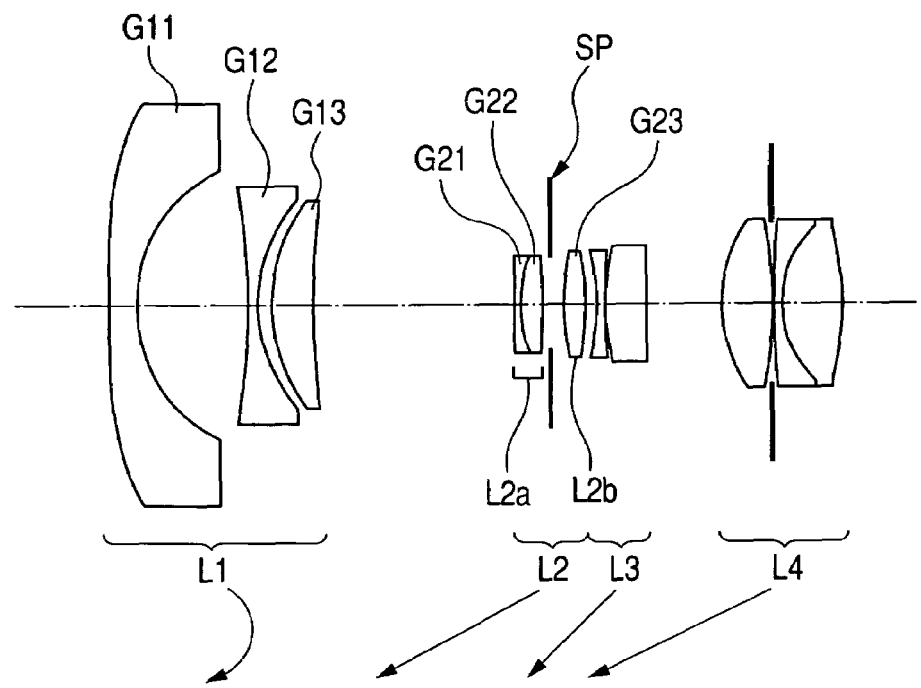
FIG. 7 is a lens sectional view showing a zoom lens according to fourth Embodiment of the present invention.
Figure 8A:
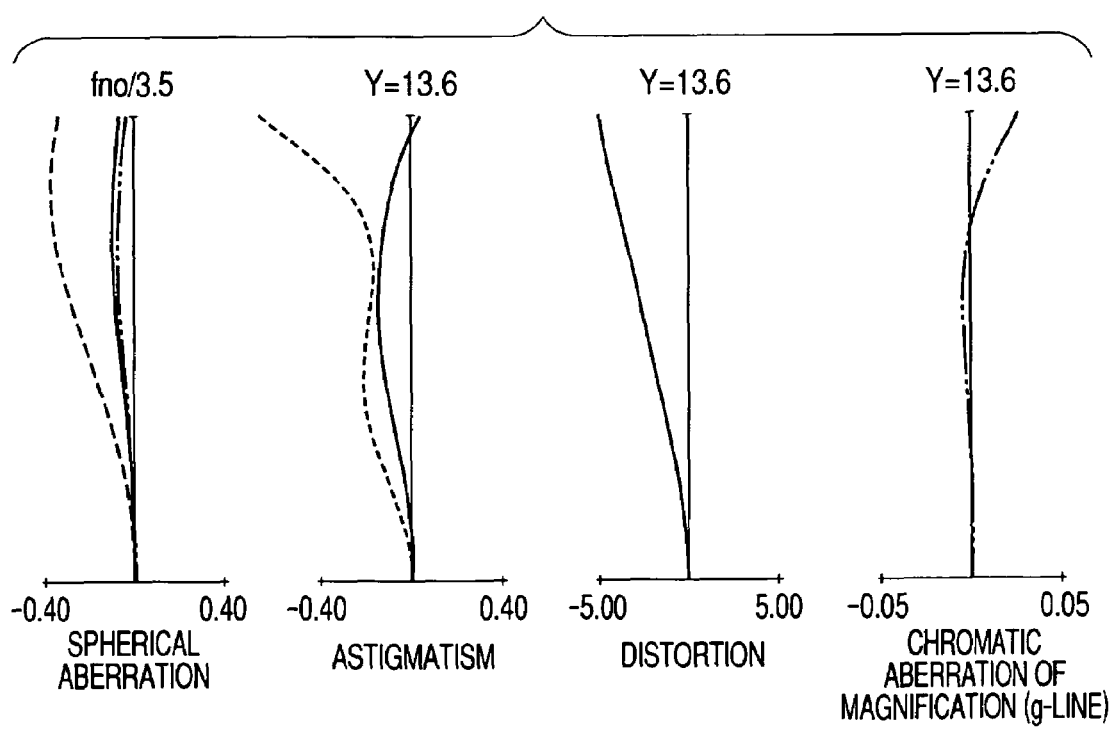
FIGS. 8A, 8B, and 8C are graphs showing various aberrations of the zoom lens according to fourth Embodiment of the present invention.
Figure 8B:
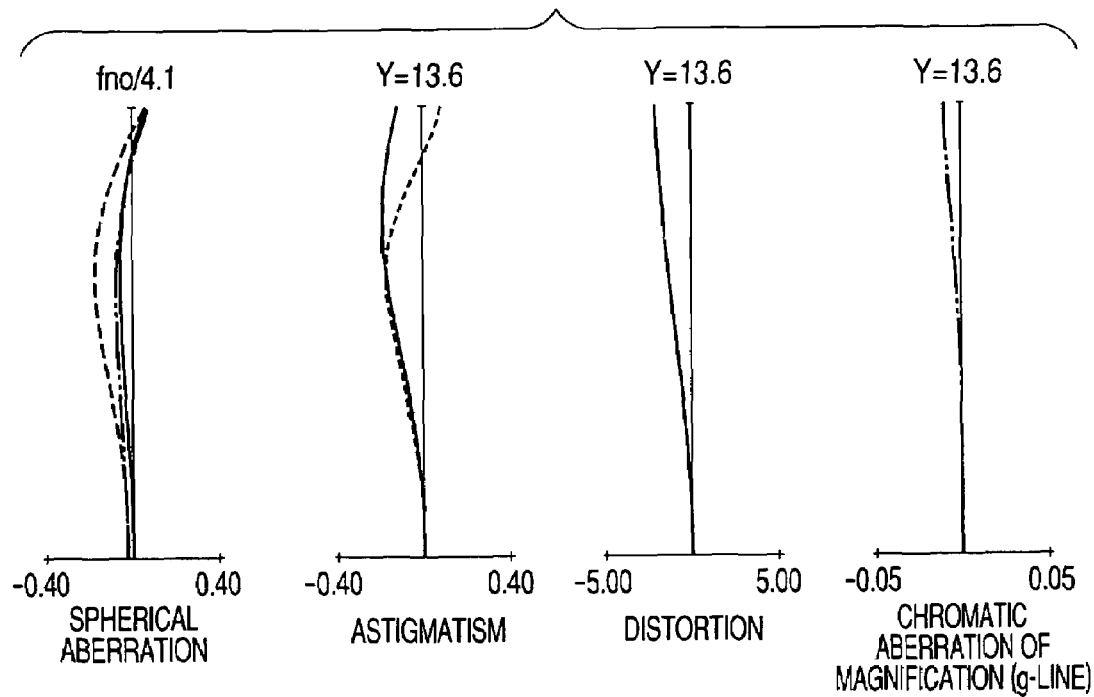
Figure 8C:
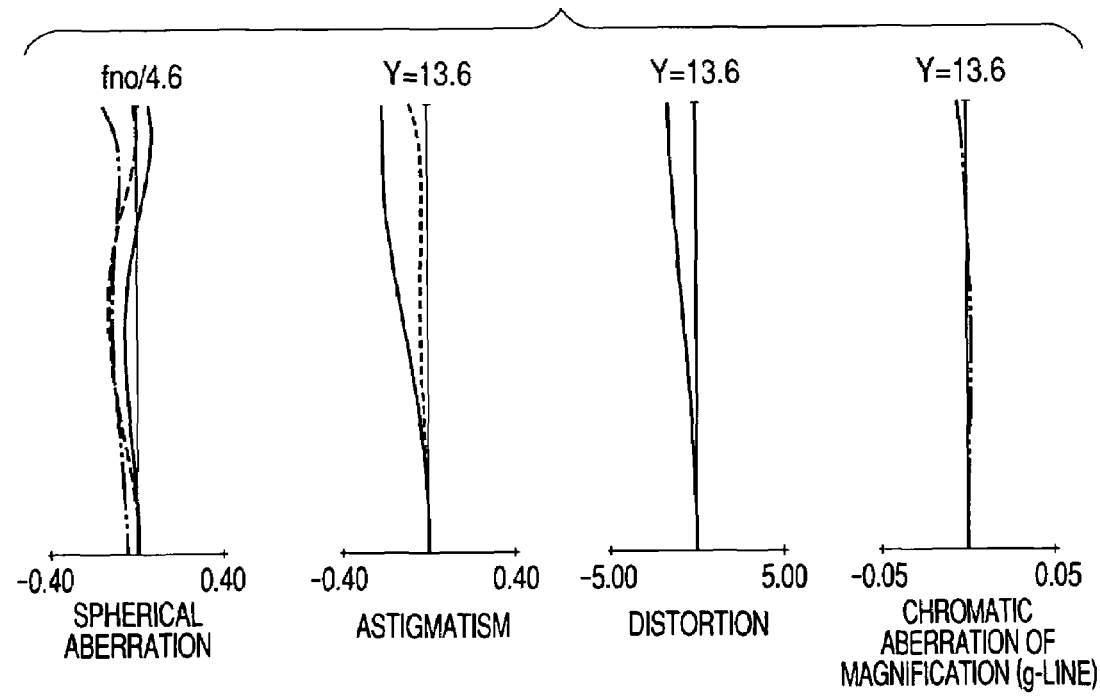
Figure 9:
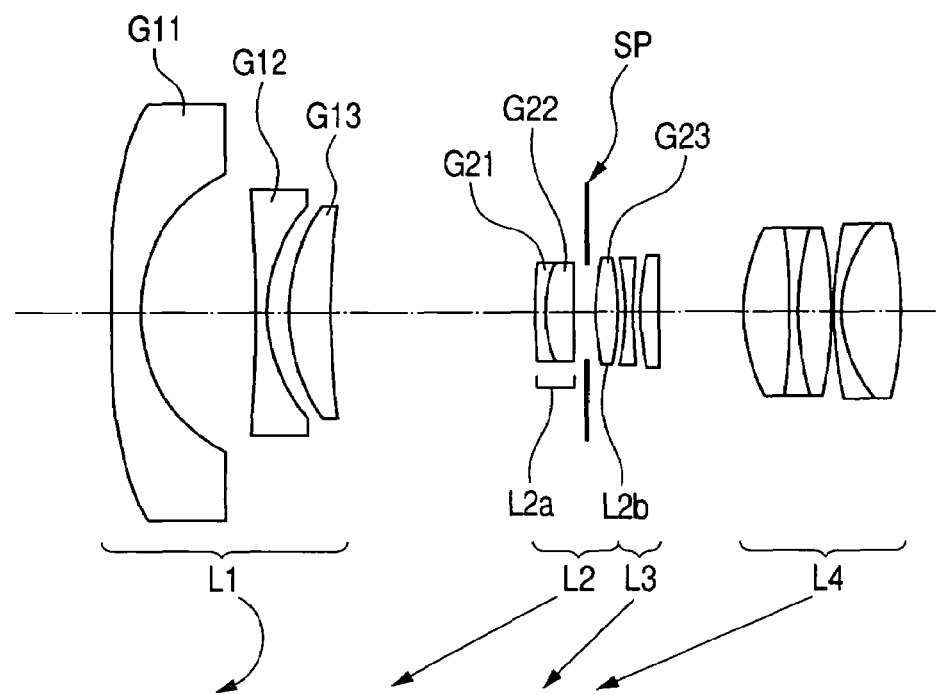
FIG. 9 is a lens sectional view showing a zoom lens according to fifth Embodiment of the present invention.
Figure 10A:
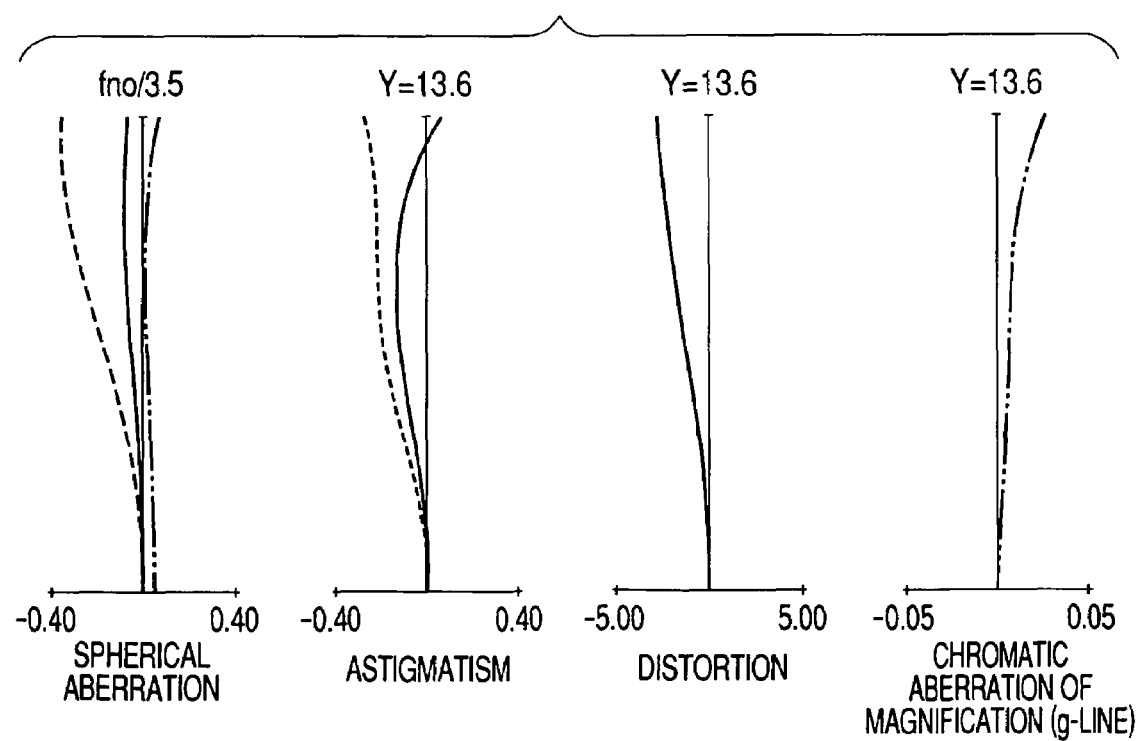
FIGS. 10A, 10B, and 10C are graphs showing various aberrations of the zoom lens according to fifth Embodiment of the present invention.
Figure 10B:
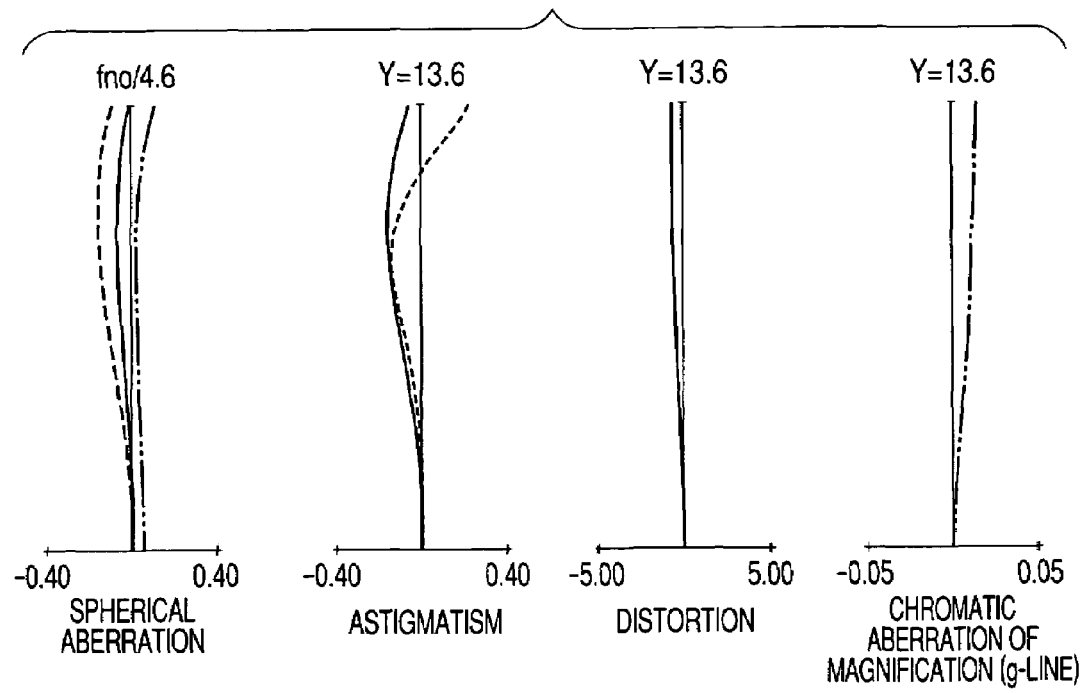
Figure 10C:
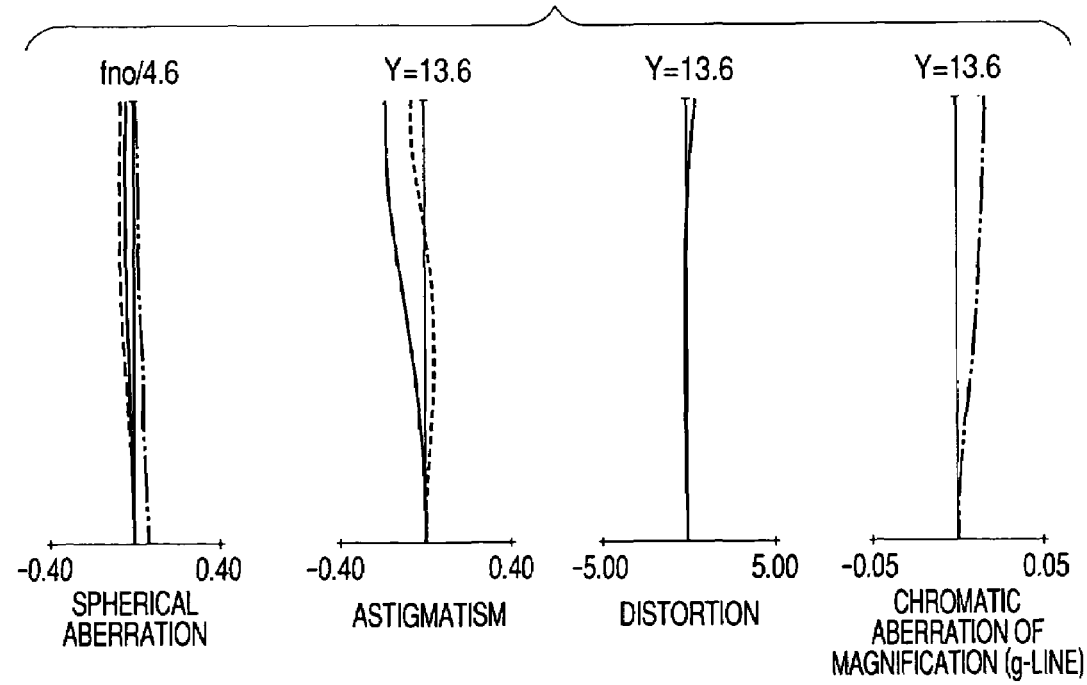
Figure 11:
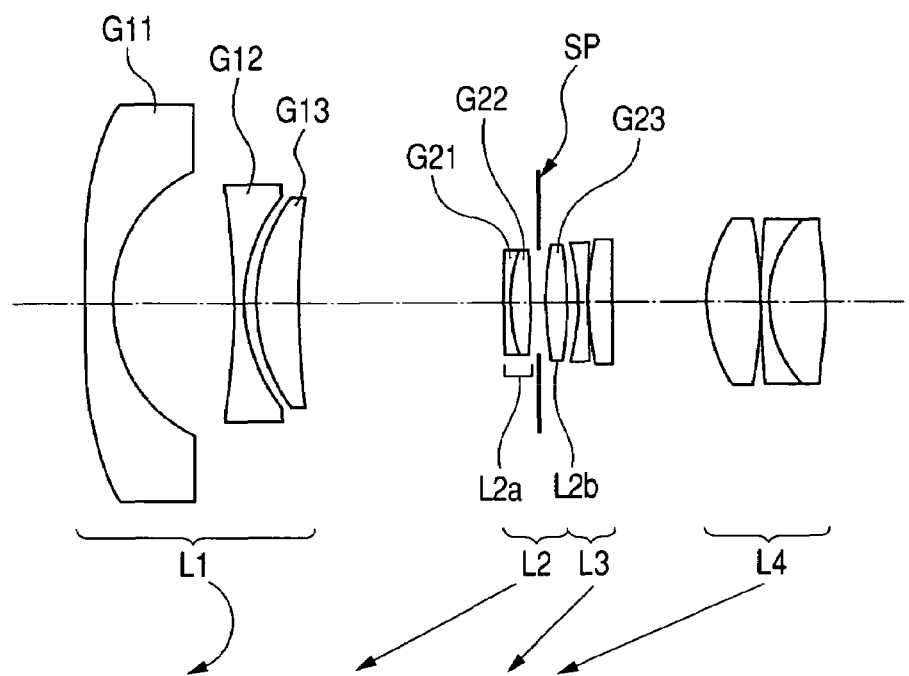
FIG. 11 is a lens sectional view showing a zoom lens according to sixth Embodiment of the present invention.
Figure 12A:
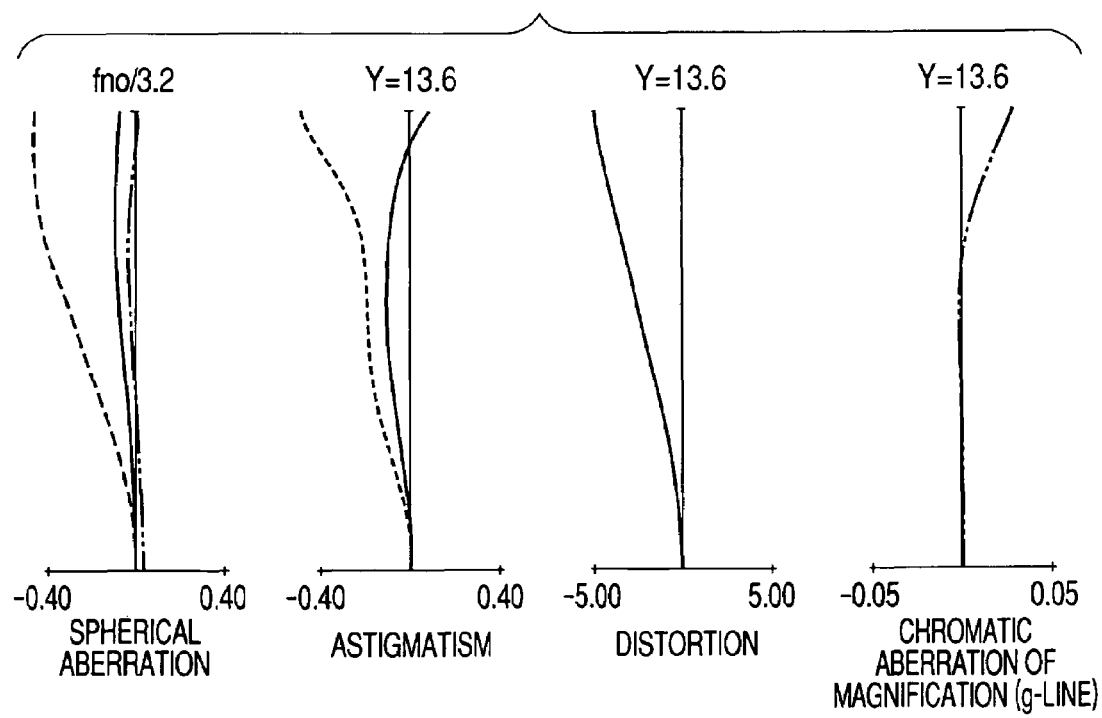
FIGS. 12A, 12B, and 12C are graphs showing various aberrations of the zoom lens according to sixth Embodiment of the present invention.
Figure 12B:
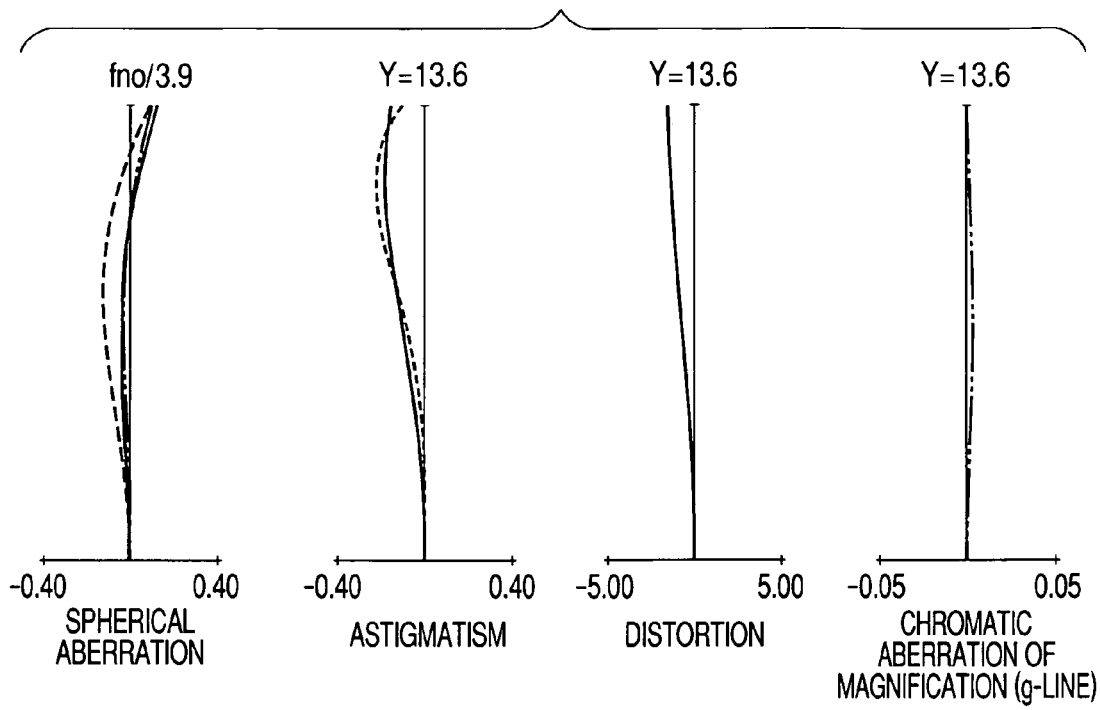
Figure 12C:
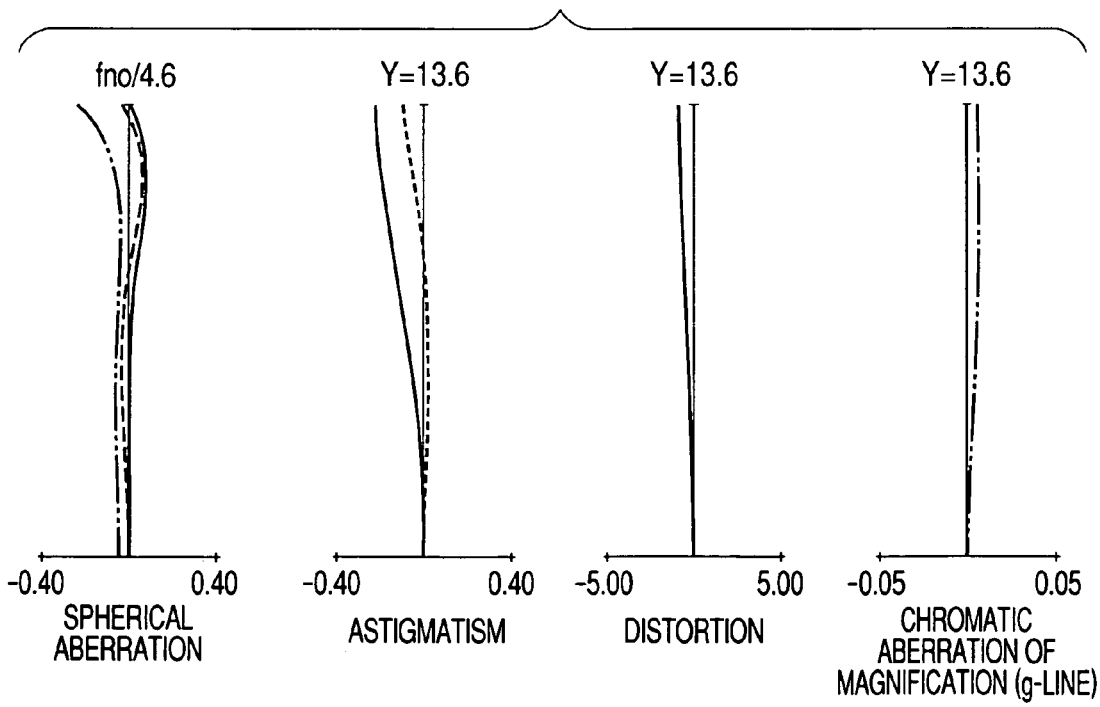

Hereinafter, a zoom lens system according to the present invention and an image pickup apparatus using the zoom lens system will be described with reference to the drawings. The zoom lens according to each of the embodiments of the present invention is suitable for an interchangeable lens for single-lens reflex camera.

FIGS. 1, 3, 5, 7, 9, and 11 are lens sectional views showing zoom lenses at a wide-angle end according to first to sixth Embodiments. FIGS. 2A, 2B and 2C, 4A, 4B and 4C, 6A, 6B and 6C, 8A, 8B and 8C, 10A, 10B and 10C, and 12A, 12B and 12C are aberration graphs showing aberrations of the zoom lenses according to first to sixth Embodiments. FIG. 2A, 4A, 6A, 8A, 10A, and 12A show states of the zoom lenses at the wide-angle end. FIGS. 2B, 4B, 6B, 8B, 10B, and 12B show states of the zoom lenses at an intermediate focal length. FIGS. 2C, 4C, 6C, 8C, 10C, and 12C show states of the zoom lenses at a telephoto end.

In the respective lens sectional views, the left side corresponds to an object side (front) and the right side corresponds to an image side (rear). In the respective lens sectional views, L1 denotes a first lens unit having a negative refractive power (optical power=the reciprocal of a focal length), L2 denotes a second lens unit having a positive refractive power, L3 denotes a third lens unit having a negative refractive power, and L4 denotes a fourth lens unit having a positive refractive power.

Symbol SP denotes an aperture stop. A sub-stop SSP is a member for regulating an open F number.

In the respective aberration graphs, symbol fno denotes an F number and symbol Y denotes an image height. Symbols d and g denote aberrations with respect to a d-line and a g-line, respectively. Symbol S.C. denotes a sine condition. Further, symbol ΔS denotes a state of a sagittal image plane and symbol ΔM denotes a state of a meridional image plane.

The first lens unit L1 includes three lenses, that is, a negative lens G11, a negative lens G12, and a positive lens G13, which are disposed in order from the object side to the image side. An image side surface of the negative lens G11 has a concave shape. An absolute value of a refractive power of the image side surface of the negative lens G11 is larger than that of an object side surface thereof. An image side surface of the negative lens G12 has a concave shape. An absolute value of a refractive power of the image side surface of the negative lens G12 is larger than that of an object side surface thereof. The positive lens G13 is formed in a meniscus shape which is convex on the object side. In any embodiment, an aspherical surface is provided as the image side surface of the negative lens G11, that is, a surface of a lens closest to the object side in each of the entire systems. In addition, in first and third to sixth Embodiments, the aspherical surface is provided for the image side surface of the negative lens G12. Note that the aspherical surface of the negative lens G12 is a so-called replica aspherical surface in which an aspherical layer made of a resin is formed on a surface of a lens made of glass.

The second lens unit L2 includes, in order from the object side to the image side, a first lens subunit L2a having a negative refractive power and a second lens subunit L2b having a positive refractive power. The first lens subunit L2a is composed of a cemented lens in which a negative lens G21 having a meniscus shape concave on the object side and a positive lens G22 having a biconvex shape are cemented to each other. The second lens subunit L2b is composed of a positive lens G23 having a biconvex shape.

In first Embodiment, the third lens unit L3 includes, in order from the object side to the image side, a negative lens having a biconcave shape and a cemented lens which is composed of a negative lens having a meniscus shape concave on the image side and a positive lens having a biconvex shape In second Embodiment, the third lens unit L3 includes, in order from the object side to the image side, a negative lens having a biconcave shape and a cemented lens which is composed of a negative lens having a meniscus shape concave on the image side and a positive lens having a meniscus shape which is convex on the object side. In third to sixth Embodiments, the third lens unit L3 includes two lenses, that is, a negative lens having a biconcave shape and a positive lens having a biconvex shape, that are disposed in order from the object side to the image side.

In first to fourth and sixth Embodiments, the fourth lens unit L4 includes, in order from the object side to the image side, a positive lens having a biconvex shape and a cemented lens composed of a negative lens, whose image side surface is of a concave shape and in which an absolute value of a refractive power of the image side surface of the negative lens is larger than that of an object side surface thereof, and a positive lens having a biconvex shape. In fifth Embodiment, the fourth lens unit L4 includes a cemented lens which is composed of a positive lens having a biconvex shape and a negative lens having a biconcave shape, a positive lens having a biconvex shape, and a cemented lens which is composed of a negative lens having a meniscus shape concave on the object side and a positive lens having a biconvex shape. In any embodiment, an aspherical surface is provided for the image side surface of the positive lens located closest to the image side, that is, a surface of a lens closest to the image side in each of the entire systems.

In the zoom lens according to each of the embodiments, the second, third, and fourth lens units are moved toward the object side during zooming from the wide-angle end to the telephoto end so as to reduce an axial interval between the first lens unit and the second lens unit, increase an axial interval between the second lens unit and the third lens unit, and reduce an axial interval between the third lens unit and the fourth lens unit. In the embodiments, in order to simplify the mechanism, the second lens unit L2 and the fourth lens unit L4 are moved collectively during zooming. Note that, when some complication of the mechanism is allowed, it is unnecessary to move the second lens unit L2 and the fourth lens unit L4 collectively. When the second lens unit L2 and the fourth lens unit L4 can be moved along different loci, the degree of freedom with respect to the suppression of an aberration variation in zooming further increases.

The position of the first lens unit L1 having the negative refractive power at the wide-angle end is set to a position closer to the object side than that at the telephoto end, and the position of the fourth lens unit L4 having the positive refractive power at the wide-angle end is set to a position closer to the image side than that at the telephoto end, to thereby enhance the retrofocus type. Such a structure is employed to easily ensure the back focus at the wide-angle end. On the other hand, the position of the second lens unit L2 having the positive refractive power at the telephoto end is set to a position closer to the object side than that at the wide-angle end, and the position of the third lens unit L3 having the negative refractive power at the telephoto end is set to a position so that a distance between the position and the second lens unit L2 is longer than that at the telephoto end, to thereby bring the zoom lens close to a telephoto type. Thus, the entire optical length (distance between the surface of the lens closest to the object side and an image surface) is shortened.

In the embodiments, such a zoom system is employed to realize a zoom lens having high optical performance with a reduction in size.

As described above, according to the zoom lenses in the embodiments, during zooming from the wide-angle end to the telephoto end, the axial interval between the first lens unit L1 and the second lens unit L2 is reduced, the axial interval between the second lens unit L2 and the third lens unit 13 is increased, and the axial interval between the third lens unit L3 and the fourth lens unit L4 is reduced. The zoom lens system according to the present invention has a fundamental structure in which such refractive power configuration is provided and the intervals are changed during zooming.

In order to ensure the back focus at the wide-angle end at which the back focus is minimized, it is necessary to provide refractive power configuration in which an image side principal point of the entire system is located closest to the image side. Therefore, in the zoom lens according to each of the embodiments, the second lens unit L2, the third lens unit L3, and the fourth lens units L4, in which a resultant refractive power of those is a positive refractive power, are disposed apart from the first lens unit L1 having the negative refractive power at the wide-angle end. That is, the refractive power configuration in which a rear lens component having a positive refractive power is located on the image side of a front lens component having a negative refractive power are totally provided. According to such refractive power configuration, the zoom lens becomes more of the retrofocus type to ensure the back focus at the wide-angle end. Even in the case of the rear lens component that composes the second lens unit L2, the third lens unit L3, and fourth lens units L4, in order to locate the image side principal point closest to the image side, the position of the third lens unit L3 having the negative refractive power at the wide-angle end is set to a position closer to the object side than that at the telephoto end. The refractive power configuration of the respective lens units composing the rear lens component is also useful to ensure the back focus of the entire system.

When the lens length of the entire system is to be reduced (shortened) at the telephoto end, it is necessary to provide refractive power configuration in which the image side principal point of the entire system is located closest to the object side. Therefore, at the telephoto end in the zoom lens according to each of the embodiments, the first lens unit L1 having the negative refractive power and the second lens unit L2 having the positive refractive power are approximated to each other to compose a front lens component having a positive refractive power. In addition, the third lens unit L3 having the negative refractive power and the fourth lens unit L4 having the positive refractive power are approximated to each other to compose a rear lens component having a negative refractive power. According to such refractive power configuration, the telephoto type is formed to shorten the entire optical length at the telephoto end.

In addition to the above-mentioned fundamental structures, according to an aspect of the present invention, the zoom lens system satisfies the following conditions, $$2.9 < bfw/fw < 5.0 \quad (1),$$

$$3.1 < f4/fw < 4.5 \quad (2),$$

$$0.1 < fw/f2 < 0.42 \quad (3),$$

where bfw denotes a back focus of the entire system at the wide-angle end, fw denotes a focal length of the entire system at the wide-angle end, and f2 and f4 denote a focal length of the second lens unit L2 and a focal length of the fourth lens unit L4, respectively.

According to another aspect of the present invention, the zoom lens system satisfies the following conditions, $$2.9 < bfw/fw < 5.0 \quad (1),$$

$$-0.8 < f2/f2a < -0.05 \quad (4),$$

$$0.1 < fw/f2 < 0.42 \quad (3),$$

where f2a denotes a focal length of the first lens subunit L2a.

Next, the technical meanings of the above-mentioned conditional expressions will be described.

The conditional expression (1) is used to provide a ratio between the focal length of the entire system at the wide-angle end and the back focus thereof at the wide-angle end in order to reduce a size of the zoom lens system.

When the back focus is too longer than the focal length so that bfw/fw becomes smaller than a lower limit value of the conditional expression (1), the entire optical length at the wide-angle end particularly increases. On the other hand, when the back focus is too shorter than the focal length so that bfw/fw exceeds an upper limit value of the conditional expression (1), the diameter of a rear lens increases.

The conditional expression (2) is used to achieve compatibility between the improvement of performance of the zoom lens system and a reduction in size thereof by suitably setting the focal length of the fourth lens unit L4.

When f4/fw becomes smaller than a lower limit value of the conditional expression (2), the refractive power of the fourth lens unit L4 is so strong (focal length is too short) that it is hard to correct particularly an astigmatism variation during zooming. In addition, it is hard to correct particularly distortion and chromatic aberration of magnification at the wide-angle end. On the other hand, when f4/fw exceeds an upper limit value of the conditional expression (2), an effect for lengthening the back focus, which is obtained by using the retrofocus type structure, becomes weaker. Therefore, it is hard to ensure the back focus at the wide-angle end. With a state in which f4/fw exceeds the upper limit value of the conditional expression (2), when the refractive power of the lens units other than the fourth lens unit L4 are adjusted to provide refractive power configuration for ensuring the back focus, the refractive power of the first lens unit L1 becomes weaker and the diameter of a front lens is likely to increase.

In order to keep a balance between the improvement of performance of the zoom lens system and the reduction in size thereof, it is desirable that the lower limit value of the conditional expression (2) be set to 3.3. In addition, it is desirable that the upper limit value of the conditional expression (2) be set to 3.9.

The conditional expression (3) is used to achieve the compatibility between the improvement of performance and the size reduction by suitably setting the focal length of the second lens unit L2.

When the refractive power of the second lens unit L2 becomes too strong so that fw/f2 is greater than an upper limit value of the conditional expression (3), it is hard to correct particularly spherical aberration at the telephoto end. With fw/f2 greater than the upper limit value of the conditional expression (3), when the refractive power of the fourth lens unit L4 is adjusted to cancel out spherical aberration caused by the second lens unit L2, parallel eccentric sensitivity with respect to the fourth lens unit L4 of the second lens unit L2 becomes significantly large. Therefore, it is hard to manufacture such a zoom lens system. On the other hand, when fw/f2 becomes smaller than a lower limit value of the conditional expression (3), an entire length shortening effect, which is obtained by using the telephoto type structure particularly at the telephoto end, becomes weaker. Therefore, the entire optical length system lengthens and the lens diameter of the second lens unit L2 increases.

In order to keep a balance between the improvement of performance of the zoom lens system and the reduction in size thereof, it is desirable that the upper limit value of the conditional expression (3) be set to 0.38.

The conditional expression (4) relates to a ratio between the focal length of the second lens unit L2 and that of the first lens subunit L2a, and is mainly used to suitably set the principal point position of the second lens unit L2.

When f2/f2a becomes smaller than a lower limit value of the conditional expression (4) and the refractive power of the first lens subunit L2a is too strong, it becomes difficult to correct spherical aberration because the paraxial marginal ray incident on the second lens subunit L2b increases. When the refractive power of the first lens subunit L2a is too weak so that f2/f2a becomes greater than an upper limit value of the conditional expression (4), it becomes difficult to secure a back focus at the wide-angle end because the principal point of the second lens unit L2 relatively moves toward object side.

It is desirable that the zoom lens system according to the present invention satisfy at least one of the following conditions (A) to (G).

(A)

The following condition (5) is satisfied, $$-0.9 < fw/f1 < -0.4 \quad (5),$$

where f1 represents a focal length of the first lens unit L1
The conditional expression (5) relates to a ratio between the focal length of the entire system and the focal length of the first lens unit L1 at the wide-angle end, and is mainly used to achieve compatibility between the reduction in size of the zoom lens system and the correction of the distortion in a balanced manner.

When the refractive power of the first lens unit L1 is so strong that fw/f1 becomes smaller than a lower limit value of the conditional expression (5), negative distortion caused by the first lens unit L1 becomes too large to be corrected. On the other hand, when the refractive power of the first lens unit L1 becomes so weak that fw/f1 is greater than an upper limit value of the conditional expression (5), the lens diameter of the first lens unit L1 which has a maximal lens diameter in the entire system increases.

It is preferable that the lower limit value of the conditional expression (5) be set to −0.75.

(B)

The following condition (6) is satisfied, $$-0.3 < fw/f3 < -0.1 \quad (6),$$

where f3 represents a focal length of the third lens unit L3.

The conditional expression (6) relates to a ratio between the focal length of the entire system and the focal length of the third lens unit L3 at the wide-angle end, and is mainly used to keep the balance between the improvement of performance and the size reduction.

When fw/f3 becomes smaller than a lower limit value of the conditional expression (6), the refractive power of the third lens unit L3 becomes too strong. Therefore, it is hard to preferably correct field curvature over the entire zoom range. On the other hand, when the refractive power of the third lens unit L3 becomes so weak that fw/f3 is greater than an upper limit value of the conditional expression (6), it is hard to provide refractive power configuration for obtaining the entire length shortening effect at the telephoto end while the back focus is ensured particularly at the wide-angle end.

Also, in order to keep the balance between the improvement of performance and the size reduction, it is desirable that the lower limit value of the conditional expression (6) be set to −0.25.

(C)

The following condition (7) is satisfied, $$1.8 < ft/fw < 2.9 \quad (7),$$

where ft represents a focal length of the entire system at the telephoto end.

The conditional expression (7) is used to provide a zoom ratio.

When ft/fw becomes smaller than a lower limit value of the conditional expression (7), the zoom ratio becomes too small to attain a desirable zoom ratio. On the other hand, when ft/fw exceeds an upper limit value of the conditional expression (7), the entire length becomes too large.

(D)

The following condition (8) is satisfied, $$1.55 < Ng1 < 1.75 \quad (8),$$

where Ng1 represents a refractive index of a material of the negative lens G11 disposed on the most object side in the first lens unit L1.

The conditional expression (8) is used to provide the refractive index of the material of the negative lens G11 of the first lens unit L1 and to bring a manufacturing cost, optical performance, and a reduced size into balance.

When the refractive index of the negative lens G11 becomes smaller than a lower limit value of the conditional expression (8), a lens diameter increases. In addition, a Petzval sum increases in the negative direction to deteriorate field curvature. On the other hand, when the refractive index of the negative lens G11 is greater than an upper limit value of the conditional expression (8), a manufacturing cost becomes higher.

(E)

The following condition (9) is satisfied, $$50 < vg1 < 70 \quad (9),$$

where vg1 represents an Abbe number of the material of the negative lens G11 disposed on the most object side in the first lens unit L1.

The conditional expression (9) is used to provide the Abbe number of the material of the negative lens G11 of the first lens unit L1.

When the Abbe number of the negative lens G11 is greater than an upper limit value of the conditional expression (9), chromatic aberration of magnification at the wide-angle end becomes so large in the positive direction at a high image height that it is hard to be corrected. On the other hand, when the Abbe number of the negative lens G11 becomes smaller than a lower limit value of the conditional expression (9), the chromatic aberration of magnification at the wide-angle end becomes so large in the negative direction at a high image height that it is hard to be corrected.

(F)

The following condition (10) is satisfied, $$3 < vg5 - vg4 < 25 \quad (10),$$

where vg4 represents an Abbe number of a material of the negative lens G21 of the first lens subunit L2a and vg5 represents an Abbe number of a material of the positive lens G22 thereof.

The conditional expression (10) relates to an Abbe number difference between the negative lens and the positive lens that compose the first lens subunit L2a, and is mainly to correct chromatic aberration.

When vg5−vg4 becomes smaller than a lower limit value of the conditional expression (10), axial chromatic aberration increases in the negative direction particularly at the telephoto end that it is hard to be corrected. On the other hand, when vg5−vg4 is greater than an upper limit value of the conditional expression (10), the axial chromatic aberration increases too much in the positive direction at the telephoto end that it is hard to be corrected.

(G)

The fourth lens L4 includes a positive lens having an aspherical shape in which a positive refractive power reduces from the center (optical axis) to the peripheral portion. The following conditions (11) and (12) are satisfied, $$1.4 < N4p < 1.55 \quad (11),$$

$$69 < v4p < 100 \quad (12),$$

where N4p and v4p represent a refractive index of a material of the positive lens and an Abbe number thereof, respectively.

Here, when various aberrations of the entire fourth lens unit L4 have not been corrected to some extent, it is hard to obtain preferable optical performance over the entire zoom range. The fourth lens L4 has a relatively strong positive refractive power. Therefore, when the aspherical shape in which the positive refractive power reduces from the center to the peripheral portion is provided, the various aberrations can be preferably corrected. It is more desirable to satisfy both of the conditional expressions (11) and (12).

The conditional expression (11) is used to provide a refractive index of the aspherical positive lens in the fourth lens unit L4 and mainly to preferably correct field curvature.

When the refractive index of the aspherical positive lens becomes smaller than a lower limit value of the conditional expression (11), the curvature radius of the aspherical positive lens becomes too small to provide a predetermined refractive power. This causes not only the difficulty of processing but also an increase in lens thickness. Therefore, it is disadvantage to ensure the back focus. On the other hand, when the refractive index of the aspherical positive lens is greater than an upper limit value of the conditional expression (11), a Petzval sum significantly increases too much in the positive direction to deteriorate the field curvature.

The conditional expression (12) defines Abbe constant of the aspherical positive lens in the fourth lens unit L4, particularly to preferably correct the chromatic aberration.

When the Abbe constant of the aspherical positive lens is too small so that v4p is less than the lower limit of the conditional expression (12), it becomes difficult to correct the chromatic aberration of magnification at the wide-angle end. Further, when the Abbe constant of the aspherical positive lens is too large so that v4p is greater than the upper limit of the conditional expression (12), an image plane of color at the wide-angle end becomes under so that it is difficult to be corrected.

According to the embodiments described above, it is possible to realize a zoom lens in which a field angle is super wide, optical performance is high over the entire zoom range, and the back focus is longer than the focal length.

Next, Numerical first to sixth Embodiments corresponding to first to sixth Embodiments will be described. In the numerical embodiments, Ri denotes a curvature radius of an i-th lens surface (i-th surface) from the object side, and Di denotes an axial interval between the i-th surface and an (i+1)-th surface. In addition, Ni denotes a refractive index of a material of an i-th member based on a d-line and vi denotes an Abbe number (vd) of the material. Further, f denotes a focal length, Fno denotes an F number, and ω denotes a half field angle.

An aspherical shape is expressed by the following expression, $$X = \frac{(1/R)Y^2}{1 + \{1 - (Y/R)^2\}^{1/2}} + AY^2 + BY^4 + CY^6 + DY^8 + EY^{10} + FY^{12},$$

where with an assumption that an optical axis direction is set as an X-axis and a direction perpendicular to the optical axis is set as a Y-axis, R denotes a curvature radius of the central portion of a lens surface (paraxial radius of curvature), and A, B, C, D, and E are aspherical coefficients.

Table 1 shows relationships between the above-mentioned conditional expressions of the present invention and the numeral embodiments.

Numerical First Embodiment f = 10.3 to 20.1  Fno = 4.1 to 4.1  2ω = 105.8 to 68.2

| | | | |
|---|---|---|---|
| *R1 = 146.274 | D1 = 2.20 | N1 = 1.677900 | v1 = 55.3 |
| R2 = 17.828 | D2 = 14.01 | | |
| R3 = 1661.193 | D3 = 1.20 | N2 = 1.834807 | v2 = 42.7 |
| R4 = 17.632 | D4 = 0.15 | N3 = 1.491710 | v3 = 57.4 |
| *R5 = 15.816 | D5 = 1.30 | | |
| R6 = 17.928 | D6 = 4.00 | N4 = 1.846660 | v4 = 23.9 |
| R7 = 36.306 | D7 = Variable | | |
| R8 = 61.096 | D8 = 1.10 | N5 = 1.834000 | v5 = 37.2 |
| R9 = 12.118 | D9 = 5.00 | N6 = 1.526366 | v6 = 48.5 |
| R10 = −338.384 | D10 = 0.09 | | |

-continued

| | | | |
|---|---|---|---|
| R11 = 21.035 | D11 = 2.80 | N7 = 1.624799 | ν7 = 47.6 |
| R12 = −46.951 | D12 = Variable | | |
| R13 = Stop | D13 = 1.50 | | |
| R14 = −31.514 | D14 = 1.20 | N8 = 1.795274 | ν8 = 44.0 |
| R15 = 65.002 | D15 = 0.32 | | |
| R16 = 94.188 | D16 = 1.00 | N9 = 1.594947 | ν9 = 40.7 |
| R17 = 17.520 | D17 = 3.00 | N10 = 1.764821 | ν10 = 26.8 |
| R18 = −1129.575 | D18 = Variable | | |
| R19 = 16.616 | D19 = 4.40 | N11 = 1.438750 | ν11 = 95.0 |
| R20 = −25.027 | D20 = 0.09 | | |
| R21 = −90.406 | D21 = 0.75 | N12 = 1.834000 | ν12 = 37.2 |
| R22 = 13.774 | D22 = 5.00 | N13 = 1.487490 | ν13 = 70.2 |
| *R23 = −25.212 | | | |

| | Focal Length | | |
|---|---|---|---|
| Variable Interval | 10.3 | 15.5 | 20.1 |
| D7 | 25.35 | 14.63 | 9.97 |
| D12 | 0.56 | 5.83 | 8.96 |
| D18 | 9.33 | 4.05 | 0.93 |

| Aspherical surface coefficients | | | |
|---|---|---|---|
| First surface: | A = 0.00000e+00 | B = 2.02239e−05 | C = −4.37934e−08 |
| | D = 6.66016e−11 | E = −4.35169e−14 | F = 9.13878e−18 |
| Fifth surface: | A = 0.00000e+00 | B = −9.41879e−06 | C = −2.53762e−07 |
| | D = 6.33799e−10 | E = 1.28832e−12 | F = −5.07824e−15 |
| Twenty-third surface: | A = 0.00000e+00 | B = 5.81996e−05 | C = 2.75462e−07 |
| | D = 1.13007e−09 | E = 3.04350e−11 | F = −2.12316e−13 |

Numerical Second Embodiment

| | | | |
|---|---|---|---|
| f = 10.3 to 19.8 Fno = 3.5 to 4.6 2ω = 105.8 to 69.0 | | | |
| *R1 = 855.604 | D1 = 2.20 | N1 = 1.677900 | ν1 = 55.3 |
| R2 = 18.638 | D2 = 16.19 | | |
| R3 = −104.987 | D3 = 1.20 | N2 = 1.834807 | ν2 = 42.7 |
| R4 = 20.466 | D4 = 1.25 | | |
| R5 = 20.302 | D5 = 4.50 | N3 = 1.846660 | ν3 = 23.9 |
| R6 = 55.840 | D6 = Variable | | |
| R7 = 163.166 | D7 = 1.10 | N4 = 1.834000 | ν4 = 37.2 |
| R8 = 12.506 | D8 = 4.59 | N5 = 1.536535 | ν5 = 46.7 |
| R9 = −114.891 | D9 = 0.09 | | |
| R10 = 23.328 | D10 = 2.80 | N6 = 1.576559 | ν6 = 46.5 |
| R11 = −37.016 | D11 = Variable | | |
| R12 = Stop | D12 = 1.50 | | |
| R13 = −30.800 | D13 = 1.20 | N7 = 1.767079 | ν7 = 50.2 |
| R14 = 79.785 | D14 = 0.16 | | |
| R15 = 59.680 | D15 = 1.00 | N8 = 1.589407 | ν8 = 39.7 |
| R16 = 18.409 | D16 = 2.60 | N9 = 1.771912 | ν9 = 29.2 |
| R17 = 467.942 | D17 = Variable | | |
| R18 = 16.276 | D18 = 5.40 | N10 = 1.438750 | ν10 = 95.0 |
| R19 = −29.890 | D19 = 0.09 | | |
| R20 = −174.128 | D20 = 0.75 | N11 = 1.834000 | ν11 = 37.2 |
| R21 = 14.196 | D21 = 5.70 | N12 = 1.487490 | ν12 = 70.2 |
| * R22 = −28.270 | | | |

| | Focal Length | | |
|---|---|---|---|
| Variable Interval | 10.3 | 15.5 | 19.8 |
| D6 | 22.07 | 11.66 | 6.92 |
| D11 | 1.00 | 6.92 | 10.47 |
| D17 | 11.08 | 5.16 | 1.61 |

| Aspherical surface coefficients | | | |
|---|---|---|---|
| First surface: | A = 0.00000e+00 | B = 2.21103e−05 | C = −4.07350e−08 |
| | D = 6.98306e−11 | E = −6.88215e−14 | F = 3.05918e−17 |
| Twenty-second surface: | A = 0.00000e+00 | B = 5.68063e−05 | C = 2.92257e−07 |
| | D = −1.66003e−10 | E = 2.90448e−11 | F = −7.13569e−14 |

Numerical Third Embodiment f = 10.3 to 21.5 Fno = 4.1 to 4.1 2ω = 105.8 to 64.7

| | | | |
|---|---|---|---|
| *R1 = −625.482 | D1 = 3.30 | N1 = 1.693501 | ν1 = 53.2 |
| R2 = 18.763 | D2 = 17.37 | | |
| R3 = −170.284 | D3 = 1.20 | N2 = 1.772499 | ν2 = 49.6 |
| R4 = 22.936 | D4 = 0.17 | N3 = 1.524210 | ν3 = 51.4 |
| *R5 = 22.530 | D5 = 1.46 | | |
| R6 = 24.154 | D6 = 5.00 | N4 = 1.846660 | ν4 = 23.9 |
| R7 = 82.219 | D7 = Variable | | |
| R8 = Sub stop | D8 = 1.23 | | |
| R9 = 293.989 | D9 = 1.00 | N5 = 1.834000 | ν5 = 37.2 |
| R10 = 17.616 | D10 = 2.85 | N6 = 1.517417 | ν6 = 52.4 |
| R11 = −97.684 | D11 = 0.11 | | |
| R12 = 28.317 | D12 = 2.80 | N7 = 1.517417 | ν7 = 52.4 |
| R13 = −37.988 | D13 = Variable | | |
| R14 = Stop | D14 = 3.55 | | |
| R15 = −27.331 | D15 = 1.44 | N8 = 1.804000 | ν8 = 46.6 |
| R16 = 115.328 | D16 = 0.39 | | |
| R17 = 41.036 | D17 = 5.89 | N9 = 1.740769 | ν9 = 27.8 |
| R18 = −171.294 | D18 = Variable | | |
| R19 = 19.792 | D19 = 6.16 | N10 = 1.438750 | ν10 = 95.0 |
| R20 = −64.144 | D20 = 0.17 | | |
| R21 = 71.177 | D21 = 1.12 | N11 = 1.834000 | ν11 = 37.2 |
| R22 = 14.827 | D22 = 7.37 | N12 = 1.487490 | ν12 = 70.2 |
| *R23 = −43.054 | | | |

| | Focal Length | | |
|---|---|---|---|
| Variable Interval | 10.3 | 16.2 | 21.5 |
| D7 | 26.67 | 10.44 | 3.28 |
| D13 | 0.84 | 7.18 | 10.30 |
| D18 | 12.00 | 5.66 | 2.54 |

| Aspherical surface coefficients | | | |
|---|---|---|---|
| First surface: | A = 0.00000e+00 | B = 2.13780e−05 | C = −3.63672e−08 |
| | D = 4.58245e−11 | E = −3.22118e−14 | F = 9.98800e−18 |
| Fifth surface: | A = 0.00000e+00 | B = 1.23725e−05 | C = −1.03957e−07 |
| | D = 4.46764e−12 | E = 5.60360e−13 | F = 1.98205e−15 |
| Twenty-third surface: | A = 0.00000e+00 | B = 2.80646e−05 | C = 1.45068e−07 |
| | D = −3.35514e−10 | E = −7.32878e−13 | F = 3.46534e−14 |

Numerical Fourth Embodiment f = 10.3 to 21.4 Fno = 3.5 to 4.6 2ω = 105.8 to 65.1

| | | | |
|---|---|---|---|
| *R1 = 12522.667 | D1 = 3.60 | N1 = 1.583126 | ν1 = 59.4 |
| R2 = 18.218 | D2 = 13.86 | | |
| R3 = −91.160 | D3 = 1.20 | N2 = 1.804000 | ν2 = 46.6 |
| R4 = 18.899 | D4 = 0.16 | N3 = 1.524210 | ν3 = 51.4 |
| *R5 = 18.224 | D5 = 1.61 | | |
| R6 = 21.501 | D6 = 5.20 | N4 = 1.805181 | ν4 = 25.4 |
| R7 = 88.240 | D7 = Variable | | |
| R8 = 117.682 | D8 = 0.95 | N5 = 1.834807 | ν5 = 42.7 |
| R9 = 15.679 | D9 = 2.80 | N6 = 1.516330 | ν6 = 64.1 |
| R10 = −74.239 | D10 = 0.88 | | |
| R11 = Stop | D11 = 1.68 | | |
| R12 = 29.025 | D12 = 2.80 | N7 = 1.517417 | ν7 = 52.4 |
| R13 = −38.262 | D13 = Variable | | |
| R14 = −26.597 | D14 = 0.92 | N8 = 1.772499 | ν8 = 49.6 |
| R15 = 53.111 | D15 = 0.20 | | |
| R16 = 32.774 | D16 = 5.24 | N9 = 1.728250 | ν9 = 28.5 |
| R17 = −130.858 | D17 = Variable | | |
| R18 = 18.247 | D18 = 6.49 | N10 = 1.438750 | ν10 = 95.0 |
| R19 = −52.394 | D19 = 0.15 | | |
| R20 = 137.851 | D20 = 1.00 | N11 = 1.834000 | ν11 = 37.2 |
| R21 = 13.762 | D21 = 7.50 | N12 = 1.487490 | ν12 = 70.2 |
| *R22 = −30.485 | | | |

-continued

|  | Focal Length | | |
|---|---|---|---|
| Variable Interval | 10.3 | 16.1 | 21.4 |
| D7 | 25.13 | 11.61 | 5.80 |
| D13 | 1.38 | 6.93 | 10.30 |
| D17 | 9.60 | 4.05 | 0.68 |

| Aspherical surface coefficients | | | |
|---|---|---|---|
| First surface: | A = 0.00000e+00 | B = 2.33683e−05 | C = −4.36269e−08 |
| | D = 7.08920e−11 | E = −6.68556e−14 | F = 2.91205e−17 |
| Fifth surface: | A = 0.00000e+00 | B = 3.33261e−06 | C = −1.22229e−07 |
| | D = 7.17771e−11 | E = 5.26933e−13 | F = −1.48671e−15 |
| Twenty-second surface: | A = 0.00000e+00 | B = 3.27834e−05 | C = 1.85266e−07 |
| | D = −2.51524e−11 | E = −6.39785e−12 | F = 9.28438e−14 |

Numerical Fifth Embodiment f = 10.3 to 21.4  Fno = 3.5 to 4.6  2ω = 105.8 to 65.0

| *R1 = 15000.000 | D1 = 3.50 | N1 = 1.583126 | ν1 = 59.4 |
|---|---|---|---|
| R2 = 18.867 | D2 = 14.03 | | |
| R3 = −226.498 | D3 = 1.30 | N2 = 1.772499 | ν2 = 49.6 |
| R4 = 18.212 | D4 = 0.06 | N3 = 1.524210 | ν3 = 51.4 |
| *R5 = 16.990 | D5 = 2.72 | | |
| R6 = 21.759 | D6 = 5.25 | N4 = 1.728250 | ν4 = 28.5 |
| R7 = 74.984 | D7 = Variable | | |
| R8 = 57.846 | D8 = 1.25 | N5 = 1.834807 | ν5 = 42.7 |
| R9 = 15.171 | | N6 = 1.517417 | ν6 = 52.4 |
| R10 = −331.383 | D10 = 1.54 | | |
| R11 = Stop | D11 = 1.10 | | |
| R12 = 31.100 | D12 = 2.55 | N7 = 1.518229 | ν7 = 58.9 |
| R13 = −31.100 | D13 = Variable | | |
| R14 = −29.031 | D14 = 0.80 | N8 = 1.804000 | ν8 = 46.6 |
| R15 = 48.270 | D15 = 0.94 | | |
| R16 = 35.215 | D16 = 2.18 | N9 = 1.846660 | ν9 = 23.9 |
| R17 = −1475.794 | D17 = Variable | | |
| R18 = 20.163 | D18 = 5.77 | N10 = 1.496999 | ν10 = 81.5 |
| R19 = −118.970 | D19 = 1.00 | N11 = 1.834000 | ν11 = 37.2 |
| R20 = 34.753 | D20 = 0.05 | | |
| R21 = 35.934 | D21 = 4.15 | N12 = 1.438750 | ν12 = 95.0 |
| R22 = −48.578 | D22 = 0.15 | | |
| R23 = 42.917 | D23 = 1.00 | N13 = 1.834000 | ν13 = 37.2 |
| R24 = 15.239 | D24 = 7.51 | N14 = 1.484560 | ν14 = 70.0 |
| *R25 = −33.295 | | | |

|  | Focal Length | | |
|---|---|---|---|
| Variable Interval | 10.3 | 15.0 | 21.4 |
| D7 | 25.15 | 12.57 | 4.73 |
| D13 | 1.03 | 5.32 | 9.62 |
| D17 | 10.23 | 5.94 | 1.64 |

| Aspherical surface coefficients | | | |
|---|---|---|---|
| First surface: | A = 0.00000e+00 | B = 2.33700e−05 | C = −4.61000e−08 |
| | D = 7.45700e−11 | E = −6.90700e−14 | F = 2.82500e−17 |
| Fifth surface: | A = 0.00000e+00 | B = 3.82416e−06 | C = −1.84863e−07 |
| | D = 1.59788e−10 | E = 1.36095e−12 | F = −7.62240e−15 |
| Twenty-fifth surface: | A = 0.00000e+00 | B = 2.79907e−05 | C = 9.77159e−08 |
| | D = −1.24882e−10 | E = 2.46435e−12 | F = 1.04886e−14 |

Numerical Sixth Embodiment f = 10.3 to 24.3 Fno = 3.2 to 4.6 2ω = 105.8 to 58.6

| | | | |
|---|---|---|---|
| *R1 = 10448.091 | D1 = 3.40 | N1 = 1.693501 | ν1 = 53.2 |
| R2 = 18.781 | D2 = 15.15 | | |
| R3 = −100.501 | D3 = 1.20 | N2 = 1.772499 | ν2 = 49.6 |
| R4 = 20.147 | D4 = 0.16 | N3 = 1.524210 | ν3 = 51.4 |
| *R5 = 19.787 | D5 = 1.41 | | |
| R6 = 22.166 | D6 = 5.30 | N4 = 1.805181 | ν4 = 25.4 |
| R7 = 97.935 | D7 = Variable | | |
| R8 = 124.556 | D8 = 0.95 | N5 = 1.834807 | ν5 = 42.7 |
| R9 = 17.063 | D9 = 2.62 | N6 = 1.516330 | ν6 = 64.1 |
| R10 = −83.672 | D10 = 1.01 | | |
| R11 = Stop | D11 = 0.80 | | |
| R12 = 28.856 | D12 = 2.90 | N7 = 1.517417 | ν7 = 52.4 |
| R13 = −38.630 | D13 = Variable | | |
| R14 = −26.466 | D14 = 1.13 | N8 = 1.772499 | ν8 = 49.6 |
| R15 = 71.048 | D15 = 0.20 | | |
| R16 = 36.519 | D16 = 3.09 | N9 = 1.728250 | ν9 = 28.5 |
| R17 = −221.184 | D17 = Variable | | |
| R18 = 18.118 | D18 = 6.74 | N10 = 1.438750 | ν10 = 95.0 |
| R19 = −55.417 | D19 = 0.15 | | |
| R20 = 97.831 | D20 = 1.00 | N11 = 1.834807 | ν11 = 42.7 |
| R21 = 14.055 | D21 = 7.20 | N12 = 1.487490 | ν12 = 96.0 |
| * R22 = −35.924 | | | |

| | Focal Length | | |
|---|---|---|---|
| Variable Interval | 10.3 | 17.6 | 24.3 |
| D7 | 25.67 | 9.76 | 3.81 |
| D13 | 1.25 | 7.82 | 11.19 |
| D17 | 11.81 | 5.25 | 1.88 |

Aspherical surface coefficients

| | | | |
|---|---|---|---|
| First surface: | A = 0.00000e+00 | B = 2.34783e−05 | C = −4.58852e−08 |
| | D = 7.33713e−11 | E = −6.89739e−14 | F = 2.96011e−17 |
| Fifth surface: | A = 0.00000e+00 | B = 1.36829e−05 | C = −1.55276e−07 |
| | D = 2.28744e−10 | E = 5.21833e−14 | F = 1.89902e−15 |
| Twenty-second surface: | A = 0.00000e+00 | B = 3.53195e−05 | C = 1.69354e−07 |
| | D = −5.14294e−11 | E = 1.65007e−12 | F = 4.84168e−14 |

TABLE 1

| Conditional expression | First Embodiment | Second Embodiment | Third Embodiment | Fourth Embodiment | Fifth Embodiment | Sixth Embodiment |
|---|---|---|---|---|---|---|
| (1) | 3.55 | 3.54 | 3.54 | 3.55 | 3.42 | 3.55 |
| (2) | 3.46 | 3.49 | 3.55 | 3.50 | 3.50 | 3.46 |
| (3) | 0.35 | 0.29 | 0.24 | 0.27 | 0.30 | 0.27 |
| (4) | −0.29 | −0.48 | −0.42 | −0.23 | −0.16 | −0.21 |
| (5) | −0.72 | −0.71 | −0.61 | −0.65 | −0.63 | −0.64 |
| (6) | −0.21 | −0.17 | −0.13 | −0.15 | −0.19 | −0.17 |
| (7) | 1.95 | 1.92 | 2.09 | 2.07 | 2.07 | 2.36 |
| (8) | 1.678 | 1.678 | 1.694 | 1.583 | 1.583 | 1.694 |
| (9) | 55.3 | 55.3 | 53.2 | 59.4 | 59.4 | 53.2 |
| (10) | 11.4 | 9.5 | 15.3 | 21.4 | 9.7 | 21.4 |
| (11) | 1.487 | 1.487 | 1.487 | 1.487 | 1.485 | 1.487 |
| (12) | 70.2 | 70.2 | 70.2 | 70.2 | 70.0 | 96.0 |

Next, an example in which the zoom lens system according to the present invention is applied to an image pickup apparatus will be described with reference to FIG. 13.

Figure 13:
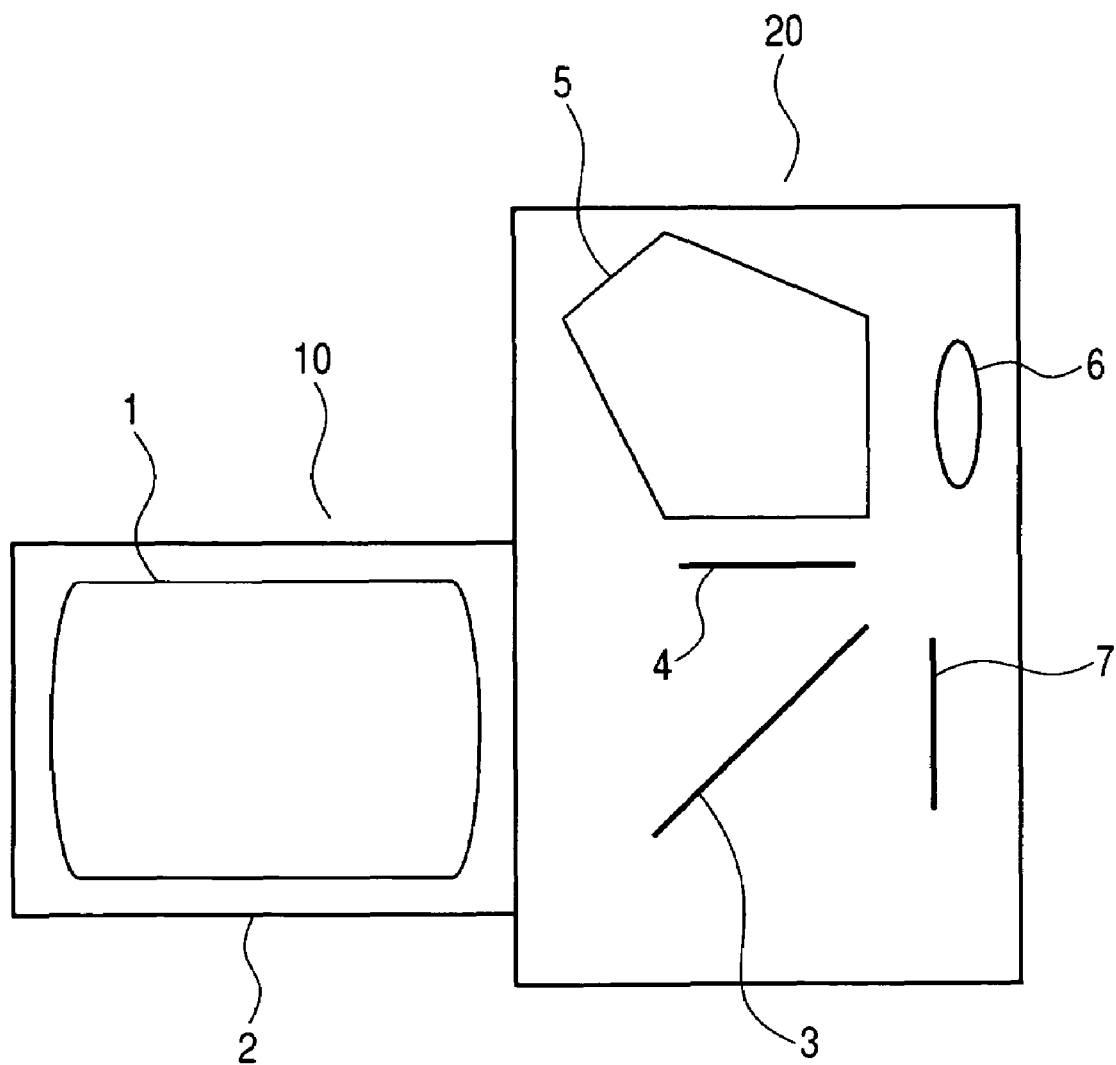
FIG. 13 is a main part schematic view showing an image pickup apparatus.

FIG. 13 is a main part schematic view showing a single-lens reflex camera. In FIG. 13, a photographing lens 10 has a zoom lens 1 according to any one of first to sixth Embodiments. The zoom lens 1 is held by a lens barrel 2 serving as a holding member. A camera main body 20 includes a quick return mirror 3 for reflecting a light beam from the photographing lens 10 upward, a focusing glass 4 located at an image forming position of the photographing lens 10, a penta roof prism 5 for converting an inverted image formed on the focusing glass 4 into an erect image, and an eyepiece 6 for observing the erect image. A solid-state image pickup element (photoelectric transducer) such as a CCD sensor or CMOS sensor or a silver-halide film is disposed in a photosensitive surface 7. During photographing, the quick return mirror 3 is removed from the optical path and an image is formed on the photosensitive surface 7 by the photographing lens 10.

The optical devices as disclosed in the embodiment mode of the present invention effectively benefit from the effects described in first to sixth Embodiments.

This application claims priority from Japanese Patent Application No. 2004-187856 filed on Jun. 25, 2004, which is hereby incorporated by reference herein.

What is claimed is:

1. A zoom lens system, comprising, in order from an object side to an image side:
   a first lens unit having negative optical power;
   a second lens unit having positive optical power;
   a third lens unit having negative optical power; and
   a fourth lens unit having positive optical power,
   wherein during zooming from a wide-angle end to a telephoto end, an interval between the first lens unit and the second lens unit reduces, an interval between the second lens unit and the third lens unit increases, and an interval between the third lens unit and the fourth lens unit reduces, and
   wherein the following conditions are satisfied, $2.9 < bfw/fw < 5.0$, $3.1 < f4/fw < 4.5$, $0.1 < fw/f2 < 0.42$, where bfw represents a back focus of the zooming lens system at the wide-angle end, fw represents a focal length of the zooming lens system at the wide-angle end, and f2 and f4 represent a focal length of the second lens unit and a focal length of the fourth lens unit, respectively.

2. A zoom lens system according to claim 1, wherein the following condition is satisfied, $-0.9 < fw/f1 < -0.4$, where f1 represents a focal length of the first lens unit.

3. A zoom lens system according to claim 1, wherein the following condition is satisfied, $-0.3 < fw/f3 < -0.1$, where f3 represents a focal length of the third lens unit.

4. A zoom lens system according to claim 1, wherein the following condition is satisfied, $1.8 < ft/fw < 2.9$, where ft represents a focal length of the zoom lens system at the telephoto end.

5. A zoom lens system according to claim 1,
   wherein the first lens unit comprises at least one negative lens, and
   wherein the following condition is satisfied, $1.55 < Ng1 < 1.75$, where Ng1 represents a refractive index of a material of the negative lens of the first lens unit which is disposed on the most object side.

6. A zoom lens system according to claim 1,
   wherein the first lens unit comprises at least one negative lens, and
   wherein the following condition is satisfied, $50 < vg1 < 70$, where vg1 represents an Abbe number of a material of the negative lens of the first lens unit which is disposed on the most object side.

7. A zoom lens system according to claim 1,
   wherein the fourth lens unit comprises a positive lens having an aspherical shape in which positive optical power reduces from a center to a peripheral portion, and
   wherein the following conditions are satisfied, $1.4 < N4p < 1.55$, $69 < v4p < 100$, where N4p and v4p represent a refractive index of a material of the positive lens and an Abbe number thereof, respectively.

8. A zoom lens system according to claim 1,
   wherein the second lens unit consists, in order from the object side to the image side, of a first lens subunit having negative optical power and a second lens subunit having positive optical power, and
   wherein the first lens subunit comprises a negative lens and a positive lens that satisfy the following condition, $3 < vg5 - vg4 < 25$, where vg4 is an Abbe number of a material of which the negative lens of the first lens subunit is made and vg5 is an Abbe number of a material of which the positive lens of the first lens subunit is made.

9. A zoom lens system according to claim 1, wherein the zoom lens system forms an image on a photoelectric transducer.

10. A zoom lens system, comprising, in order from an object side to an image side:
    a first lens unit having negative optical power;
    a second lens unit having positive optical power, the second lens unit consisting, in order from the object side to the image side, of a first lens subunit having negative optical power and a second lens subunit having positive optical power;
    a third lens unit having negative optical power; and
    a fourth lens unit having positive optical power,
    wherein during zooming from a wide-angle end to a telephoto end, an interval between the first lens unit and the second lens unit reduces, an interval between the second lens unit and the third lens unit increases, and an interval between the third lens unit and the fourth lens unit reduces, and
    wherein the following conditions are satisfied, $2.9 < bfw/fw < 5.0$, $-0.8 < f2/f2a < -0.05$, $0.1 < fw/f2 < 0.42$, where bfw represents a back focus of the zooming lens system at the wide-angle end, fw represents a focal length of the zooming lens system at the wide-angle end, f2 represents a focal length of the second lens unit, and f2a represents a focal length of the first lens subunit.

11. A zoom lens system according to claim 10, wherein the following condition is satisfied, $-0.9 < fw/f1 < -0.4$, where f1 represents a focal length of the first lens unit.

12. A zoom lens system according to claim 10, wherein the following condition is satisfied, $-0.3 < fw/f3 < -0.1$, where f3 represents a focal length of the third lens unit.

13. A zoom lens system according to claim 10, wherein the following condition is satisfied, $$1.8 < ft/fw < 2.9,$$

where ft represents a focal length of the zoom lens system at the telephoto end.

14. A zoom lens system according to claim 10,
wherein the first lens unit comprises at least one negative lens, and
wherein the following condition is satisfied, $$1.55 < Ng1 < 1.75,$$

where Ng1 represents a refractive index of a material of the negative lens of the first lens unit which is disposed on the most object side.

15. A zoom lens system according to claim 10,
wherein the first lens unit comprises at least one negative lens, and
wherein the following condition is satisfied, $$50 < vg1 < 70,$$

where vg1 represents an Abbe number of a material of the negative lens of the first lens unit which is disposed on the most object side.

16. A zoom lens system according to claim 10,
wherein the fourth lens unit comprises a positive lens having an aspherical shape in which positive optical power reduces from a center to a peripheral portion, and
wherein the following conditions are satisfied, $$1.4 < N4p < 1.55,$$

$$69 < v4p < 100,$$

where N4p and v4p represent a refractive index of a material of the positive lens and an Abbe number thereof, respectively.

17. A zoom lens system according to claim 10,
wherein the first lens subunit comprises a negative lens and a positive lens that satisfy the following condition, $$3 < vg5 - vg4 < 25,$$

where vg4 represents an Abbe number of a material of the negative lens of the first lens subunit and vg5 is an Abbe number of a material of the positive lens of the first lens subunit.

18. A zoom lens system according to claim 10, wherein the zoom lens system forms an image on a photoelectric transducer.

19. An image pickup apparatus, comprising:
the zoom lens system according to claim 1; and
a photoelectric transducer for receiving an image formed by the zoom lens system.

20. An image pickup apparatus, comprising:
the zoom lens system according to claim 10; and
a photoelectric transducer for receiving an image formed by the zoom lens system.

* * * * *